R.W.COURSEY
INVENTOR.
BY Jerry J. Dunlap
ATTORNEY

Dec. 8, 1959 R. W. COURSEY 2,916,168

MASS STORAGE SYSTEM

Filed June 2, 1958 15 Sheets-Sheet 2

R. W. COURSEY
INVENTOR.

BY Jerry J. Dunlap

ATTORNEY

Dec. 8, 1959 R. W. COURSEY 2,916,168

MASS STORAGE SYSTEM

Filed June 2, 1958 15 Sheets-Sheet 3

R. W. COURSEY
INVENTOR.

BY Jerry J. Dunlap

ATTORNEY

Dec. 8, 1959 R. W. COURSEY 2,916,168

MASS STORAGE SYSTEM

Filed June 2, 1958 15 Sheets-Sheet 4

R.W. COURSEY
INVENTOR.

BY Jerry J. Dunlap

ATTORNEY

R.W. COURSEY
INVENTOR.
BY Jerry J Dunlap
ATTORNEY

Dec. 8, 1959 R. W. COURSEY 2,916,168

MASS STORAGE SYSTEM

Filed June 2, 1958 15 Sheets-Sheet 6

R. W. COURSEY
INVENTOR.

BY Jerry J Dunlap

ATTORNEY

R. W. COURSEY
INVENTOR.

BY Jerry J. Dunlap

ATTORNEY

Dec. 8, 1959 R. W. COURSEY 2,916,168

MASS STORAGE SYSTEM

Filed June 2, 1958 15 Sheets-Sheet 8

R.W.COURSEY
INVENTOR.

BY Jerry J Dunlap

ATTORNEY

Dec. 8, 1959 R. W. COURSEY 2,916,168

MASS STORAGE SYSTEM

Filed June 2, 1958 15 Sheets-Sheet 9

R.W.COURSEY
INVENTOR.

BY Jerry J Dunlap

ATTORNEY

Dec. 8, 1959 R. W. COURSEY 2,916,168

MASS STORAGE SYSTEM

Filed June 2, 1958 15 Sheets-Sheet 10

R.W.COURSEY
INVENTOR.

BY Jerry J Dunlap

ATTORNEY

Dec. 8, 1959 R. W. COURSEY 2,916,168

MASS STORAGE SYSTEM

Filed June 2, 1958 15 Sheets-Sheet 11

R.W. COURSEY
INVENTOR.

BY Jerry J. Dunlap

ATTORNEY

R. W. COURSEY
INVENTOR.

BY Jerry J Dunlap

ATTORNEY

R. W. COURSEY
INVENTOR.
BY Jerry J. Dunlap
ATTORNEY

Dec. 8, 1959 R. W. COURSEY 2,916,168

MASS STORAGE SYSTEM

Filed June 2, 1958 15 Sheets-Sheet 14

R.W. COURSEY
INVENTOR.

BY Jerry J Dunlap

ATTORNEY

R.W. COURSEY
INVENTOR.
BY Jerry J Dunlap
ATTORNEY

United States Patent Office 2,916,168

Patented Dec. 8, 1959

2,916,168

MASS STORAGE SYSTEM

Ralph W. Coursey, Oklahoma City, Okla.

Application June 2, 1958, Serial No. 739,386

21 Claims. (Cl. 214—16.1)

This invention relates generally to improvements in storage systems particularly adapted for storing articles for relatively short periods of time, such as one day or less, and more particularly, but not by way of limitation, to an improved method and system for automatically storing large numbers of articles for a relatively short period of time.

The present method and system will be described as particularly adapted for the storage or parking of automobiles, although the invention may be used in connection with the storage of any desired type of articles, and it is to be understood that this invention is not limited to the storage of automobiles, except as may be defined in the claims appended hereto.

With the tremendous increase in the number of automobiles in urban areas in recent years, the problem of parking automobiles for relatively short periods of time has become increasingly important. As a result, several different types of parking systems for accommodating large numbers of cars have been developued. Most of these systems are partially automatic and utilize one or more elevators for raising the automobiles to floor levels above the street level, and several automobile storage spaces are provided at each floor level. In a popular present day system, a series of elevators are provided in side-by-side relation to lift automobiles several stories, and an automobile lifted by an elevator is moved out of the elevator and into a parking stall adjacent to the elevator at the desired floor level. In some cases the automobile is driven off of the elevator to a parking stall at the particular floor level of the building housing the system, and in other cases a separate lifting mechanism is used to lift the automobile off of the elevator and place it in a storage space at one side of the elevator. In this type of system, a substantial amount of the potential parking space in a buildings is used by the elevator shafts, since all of the elevators are necessarily moved through each floor level of the building. It will also be noted that the driving or lifting of an automobile between the carriage of an elevator and a parking stall is a dangerous operation, particularly at the elevated floor levels.

Several systems have also been devised which utilize vertically extending track loops to utilize a greater portion of the potential parking space in a building and minimize the number of elevators required to move automobiles to and from their parking positions. In these systems, however, a relatively large number of automobiles must be moved in the vertical loops to remove an automobile which happens to be at a remote point with respect to the elevator.

The present invention contemplates a novel parking system wherein the automobiles are supported in carriages throughout the parking, storing and unparking operations to minimize the possibility of damage to an automobile. The carriages are movably supported on horizontal track loops, there being a horizontally extending track loop at each of the elevated floor levels of a building housing the system, with a plurality of carriages movably supported on each loop. Also, several of the individual systems may be arranged side-by-side to more completely occupy an existing structure, and each system may be of any desired height. In the preferred embodiment, the loops are elongated and the carriages are suspended from the loops in end-to-end relation along the longer sides of the loops. This invention also contemplates the use of novel turn devices for moving the carriages around the curved end portions of the loops while retaining the orientation of the carriages, such that a carriage is extended in the same direction during movement thereof all the way around its respective loop. By retaining the orientation of the carriages, and reducing the width of the respective loop to a minimum, a practical number of carriages may be supported in the loop, yet a space will be provided between a pair of the carriages at each end of the loop of a size to accommodate an elevator shaft. With this carriage arrangement and circulation, the elevator shaft merely occupies a space in the loop which would not otherwise be used and does not, therefore, subtract from the available parking space. It is preferred that a single elevator be provided for a plurality of vertically spaced track loops to minimize the cost of the system.

The present invention also contemplates a novel control system for operating the elevator and the means for moving the carriages around the various loops, such that each carriage lowered by the elevator is returned to its respective loop. In a parking operation, an empty carriage in the same loop nearest to the elevator shaft is automatically moved to the elevator to provide another empty carriage at the street level parking and unparking station. In unparking operations, the present control system automatically moves the elevator to the loop containing a requested automobile, and automatically circulates the carriages in the respective loop until the carriage containing the requested automobile is supported by the elevator; whereupon the elevator lowers the carriage to the parking and unparking station. The system is preferably constructed to give preference requests for automobiles stored in the system, such that a plurality of requests may be stored in a memory portion of the system, and the automobiles will be unparked in the sequence they were requested, to provide a minimum waiting time for users of the system requesting their automobiles. The present control system may be easily adapted to a switch-key type of operation, such that the user of the system merely drives his automobile onto an empty carriage at the parking and unparking station and removes a key from a control panel. The automobile is then automatically parked and the customer uses the removed key as a claim check for his automobile. Upon the insertion of the key in its respective receptacle, the requested automobile is automatically unparked in the manner previously described.

The present invention further contemplates a novel method of parking, storing and unparking automobiles, whereby each automobile is elevated in a carriage to a specific floor level and then moved in a loop type pattern (in a pre-determined arrangement with other carriages) for storage until requested. The automobiles are stored in carriages, such that an automobile is never removed from its respective carriage from the time the user of the system parks his automobile until the time he drives the automobile away from the location of the system. The present method further contemplates the guiding of the carriages during their movement around their respective loops, such that the maximum parking space is utilized, yet a space is provided in each loop of a size for vertical movement of a carriage therethrough; whereby a carriage from an upper loop being moved through a series of lower loops will not reduce the available parking area of the lower loops.

An important object of this invention is to provide a mass storage system wherein the maximum number of articles may be stored in a minimum space and selectively removed and replaced.

Another object of this invention is to provide a novel loop type storage system wherein carriages for the items being stored are moveably supported in vertically spaced loop patterns, such that the carriages may be selectively removed from the loops without reducing the available storage area of lower loops.

A further object of this invention is to provide a novel storage system utilizing carriages for the items being stored, wherein the minimum number of carriages are moved at any one time, and they are moved a minimum distance in the selective removal of a carriage.

Another object of this invention is to provide a storage system wherein the items being stored will be automatically moved to their respective storage areas and automatically removed when a request is made therefor.

Another object of this invention is to provide an automatic storage system utilizing carriages for the articles being stored, wherein an empty carriage is always available to receive another article to be stored, unless the system is in the process of storing or unstoring an article.

A further object of this invention is to provide a novel storage system which may be adapted to substantially any desired size of building or storage area and which may be easily expanded as desired.

A still further object of this invention is to provide an automatic parking system which is particularly adapted to the use of the maximum number of conventional structure and apparatus designs to minimize the engineering and cost of the system.

Other objects and advantages of the invention will be evident from the following detailed description, when read in conjunction with the accompanying drawings which illustrate my invention.

Figure 1A:
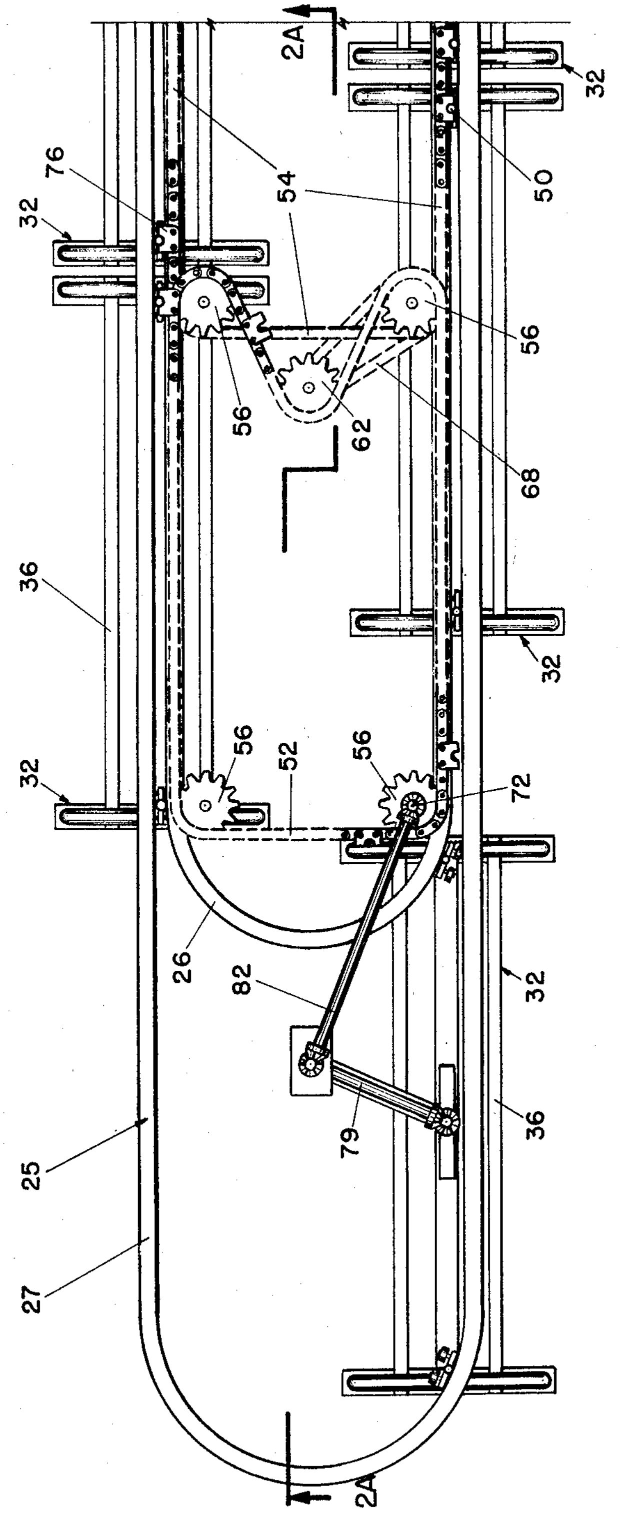
Figure 1A is plan view of one end portion of a loop assembly constructed in accordance with this invention, with several details of construction eliminated to more clearly illustrate the invention.
Figure 1B:
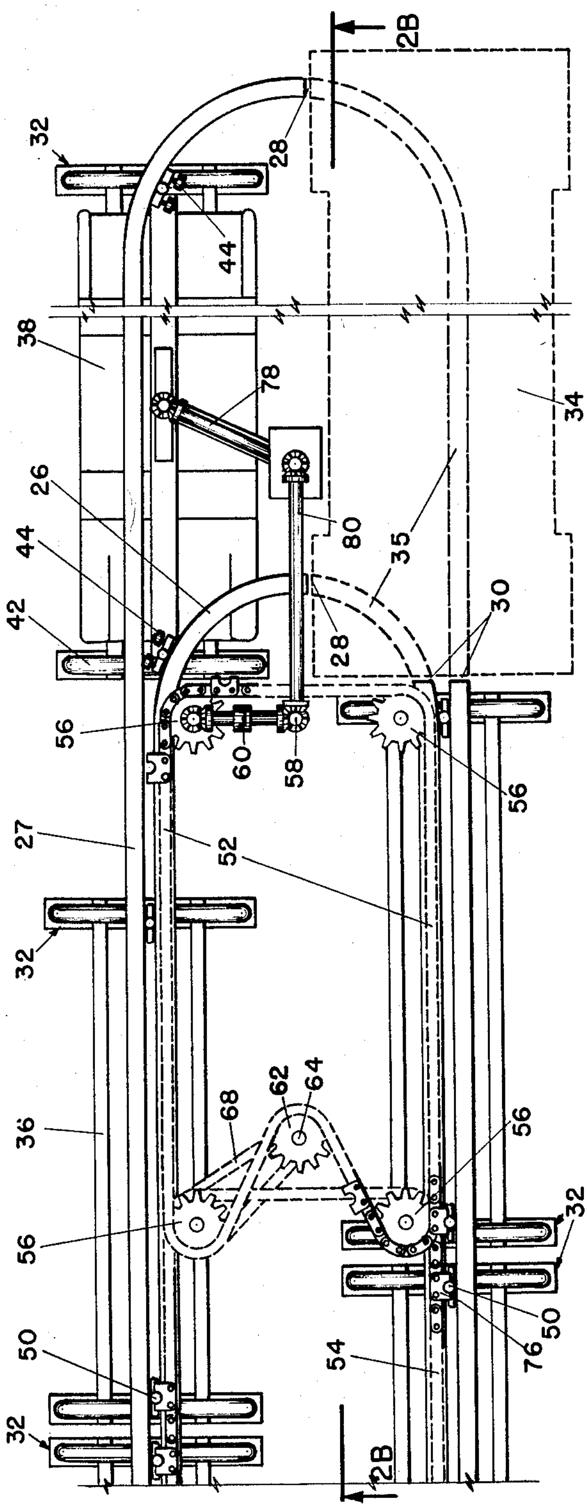
Figure 1B is a plan view, similar to Fig. 1A, of the opposite end of the loop.
Figure 2A:
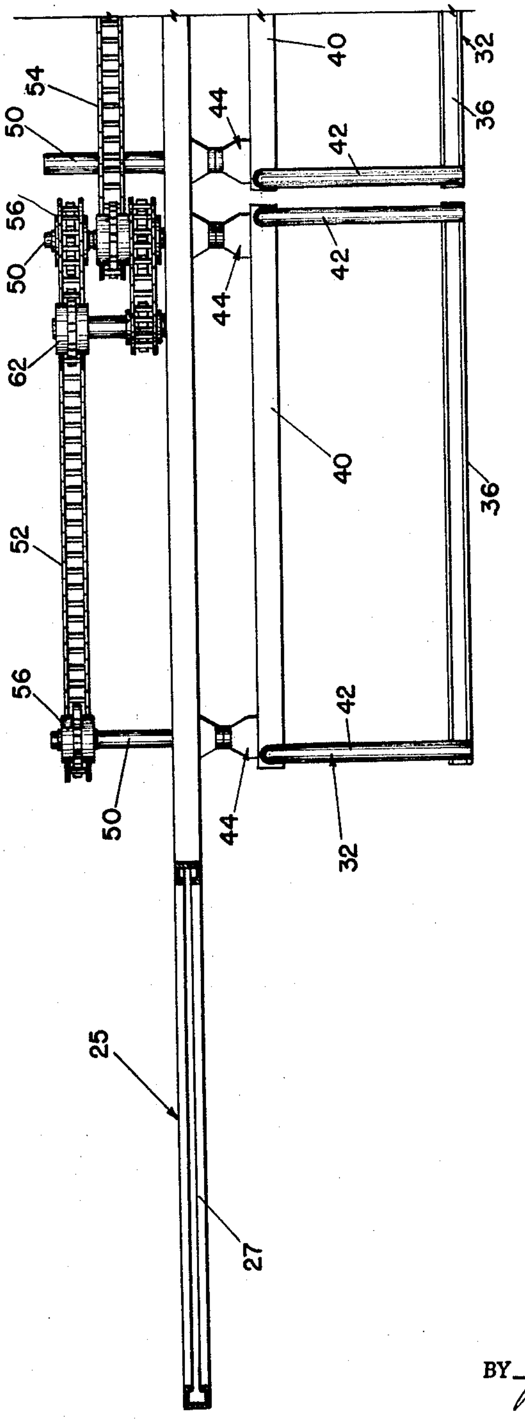
Figure 2A is a vertical sectional view of one end portion of a system constructed in accordance with this invention, as taken along lines 2A—2A of Fig. 1A, and illustrating only a single loop construction in full lines.
Figure 2B:
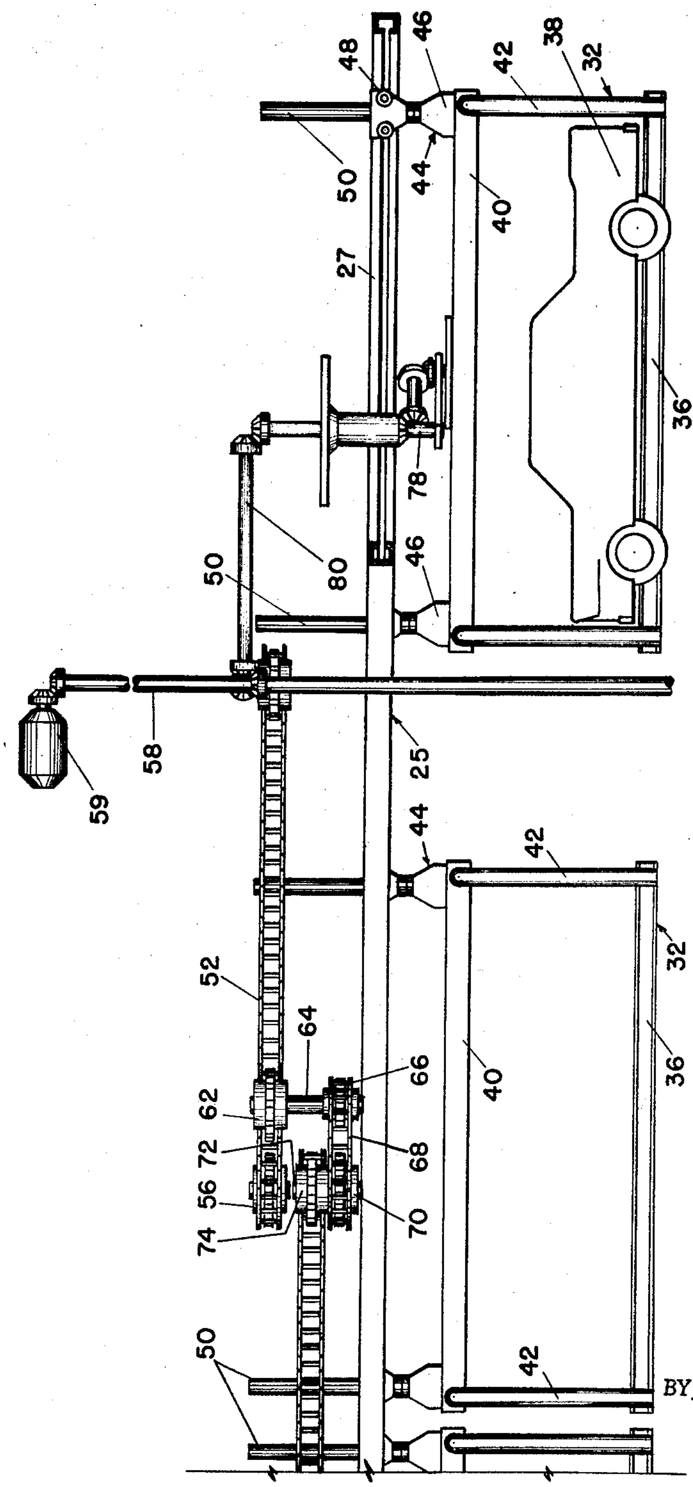
Figure 2B is a view similar to Fig. 2A and as taken along lines 2B—2B of Fig. 1B.

Referring to the drawings in detail, and particularly Figs. 1A and 1B, reference character 25 generally designates a typical elongated, horizontally extending track loop which comprises an inner track 26 and an outer track 27. A complete system will comprise several of the loops 25 in vertically spaced relation, as indicated by the dashed lines in Figs. 2A and 2B, and as will be more fully hereinafter set forth. The tracks 26 and 27 (Figs. 1A and 1B) are supported in any suitable manner (not shown) such that the track 27 concentrically encircles the inner track 26. It will be noted, however, that the outer track 27 is substantially longer than the inner track 26 to extend the opposite ends of the outer track 27 a substantial distance outwardly from the opposite ends of the inner track 26. Also, the opposite side portions of the tracks 26 and 27 are straight and parallel, with the corresponding sides of the tracks 26 and 27 disposed substantially closer together than the end portions of the tracks.

Each of the tracks 26 and 27 forms the major portion of a loop, with the opposite ends 28 and 30 of each track being spaced apart (as illustrated in Fig. 1B) at one end portion of the loop. It is preferred that the corresponding ends 28 of the tracks 26 and 27 terminate at about the center line of the loop 25, with the opposite ends 30 of the tracks 26 and 27 terminating at the respective end of the straight portion of one side of the inner track 26. The end 28 of the outer track 27 extends beyond the respective end 28 of the inner track 26 a distance substantially equal to the length of an automobile carriage 32 suspended from the loop 25. Thus, a space is provided in the loop 25 of a size for movement of a carriage elevator 34 therethrough. The elevator 34 is, of course, of a size to support one of the carriages 32 thereon and has track sections 35 on the bottom thereof to mate with the tracks 26 and 27. It may also be noted here that the opposite straight sides of the loop 25 are spaced apart a distance slightly greater than the width of a carriage 32, for purposes which will be hereinafter set forth.

A plurality of the carriages 32 are movably suspended from the track loop 25. Each carriage 32 (see Fig. 2B) comprises a base 36 having a pair of parallel bars spaced apart a sufficient distance to support an automobile 38 thereon, with the wheels of the automobile 38 straddling the base bars to prevent inadvertent movement of the automobile 38 off of the carriage 32. The carriage base 36 is suspended from a top member 40 by support arms 42 extending upwardly and then inwardly from each corner of the base 36. The top member 40 of each carriage 32 is in turn suspended from the respective track loop 25 by a pair of roller assemblies 44 secured in spaced relation along the center line of the respective carriage 32. The roller assemblies 44 are preferably secured at the ends of the carriage 32 to facilitate the guiding of the carriage 32 around the loop 25, as will be more fully hereinafter set forth.

Each roller assembly 44 comprises a base portion 46 rigidly secured to the top member 40 of the respective carriage 32, and an upper portion 48 swivelly secured to the respective base portion 46, such that each roller assembly 44 may be turned with respect to its carriage 32 during movement of the carriages around the loops, as will be more fully hereinafter set forth. The upper portion 48 of each roller assembly 44 is provided with rollers, as will be described, which engage the inner and outer tracks 26 and 27, as well as a vertically extending pin 50 for engagement by endless chains 52 and 54 as illustrated in Figs. 1A, 1B, 2A and 2B.

An endless chain 52 is provided at each end portion of the inner track 26 and extends around four sprockets 56 to position the opposite side portions of each chain 52 above the respective sides of the inner track 26. One of the sprockets 56 is geared to a vertical shaft 58 through the medium of an electrically operated clutch 60 for selective driving of the chains 52, as will be more fully hereinafter set forth. The vertical drive shaft 58 is in turn driven by a main motor 59 (see Fig. 2B), such that the same motor may be used to move the carriages around each of the vertically spaced loops 25.

Each of the end chains 52 of each loop 25 is also extended around another sprocket 62 to drive a power transfer shaft 64. Each shaft 64 is in turn provided with a smaller sprocket 66 driving another endless chain 68 at a speed less than the speed of the respective chain 52. Each chain 68 in turn extends around a sprocket 70 secured on the lower end of another shaft 72. Still another sprocket 74 is rigidly secured on each shaft 72 to receive the endless chain 54 and drive the chain 54 at a speed below the speed of the chains 52. The inner sprockets 56 of each chain 52 may be loosely supported on the respective shafts 72 in the nature of idler sprockets for economy of manufacture. The centrally located endless chain 54 also extends above and parallel with the opposite sides of the inner track 26 along the major portion of the length of the inner track 26.

Each of the chains 52 and 54 is provided with a plurality of latching members 76 (Fig. 1B) thereon extending beyond the outer edges of the straight portions of the inner track 26 to engage the pins 50 extending upwardly from the carriages 32, whereby the chains 52 and 54 may be used to propel the carriages 32 along the straight portions of the track loop 25. The latching members 76 are provided with vertical slots therein to receive the pins 50, and the latching members are secured in spaced relation along the chains 52 and 54 to provide a smooth transition of the carriages 32 during their movement from opposite one chain to opposite another chain. With the roller assemblies 44 being secured on the opposite ends of the carriages 32, it will also be noted that the end chains 52 may be used to move the carriages 32 substantially beyond the ends of the straight portions of the inner track 26 to positions opposite turn devices 78 and 79 provided in the opposite ends of the loop 25.

The turn device 78 (Fig. 1B) is geared by a connecting shaft 80 to the main drive shaft 58, and the opposite turn device 79 (Fig. 1A) is driven from the shaft 72 of one of the adjacent sprockets 56. A shaft 82 is geared to said opposite turn device 79 and the shaft 72 of the respective sprocket 56 to provide rotation of the turn devices 79 upon operation of the drive chains 52 and 54. The other turn device 78 is operated whenever the main drive shaft 58 is turned. These turn devices are used to move the carriages 32 around the end portions of the loop 25, as will be described in detail below.

From the foregoing general description, it will be observed that the present system provides a plurality of vertically spaced and horizontally extending track loops 25. Each track loop 25 is elongated with straight and parallel side portions and curved end portions to moveably support a plurality of carriages 32 therefrom. The carriages 32 are moved around the respective track loop 25 by a combination of the overlapping endless chains 52 and 54 and the turn devices 78 and 79, such that any carriage 32 may be moved to any desired point with respect to the loop 25 when the elevator 34 is in a position to complete the respective loop by its track sections 35. The straight sides of the loop 25 are spaced apart a distance only sufficient for movement of the carriages 32 lengthwise along the opposite sides of the loop, with sufficient clearance between the carriages 32 suspended from the opposite sides of the loop to accommodate suitable supporting structure (not shown) for the loop 25.

It should also be noted here that each carriage 32 remains oriented in the same direction during its entire movement around the respective loop 25. The roller assemblies 44, being positioned along the center line of the respective carriage 32, and being in engagement with both the inner and outer tracks 26 and 27 during movement of the respective carriage along the straight portions of the loop 25, will retain the carriages 32 lengthwise with respect to the loop 25. The turn devices 78 and 79 are constructed, as will be described below, in such a manner that the carriages 32 are retained oriented in the same direction during movement around the opposite end portions of the loop 25. By retaining this orientation of the carriages 32, a reasonable number of carriages may be supported by the loop, yet a space is always provided between a pair of the carriages at each end portion of the loop 25 which is of sufficient size to accommodate a carriage 32, to facilitate removal of carriages 32 from the loop 25 without reducing the potential storage space provided by the loop 25. This space at one end of the loop is utilized by the shaft for the elevator 34, as will be described below.

*Track structure*

Figures 3, 4:
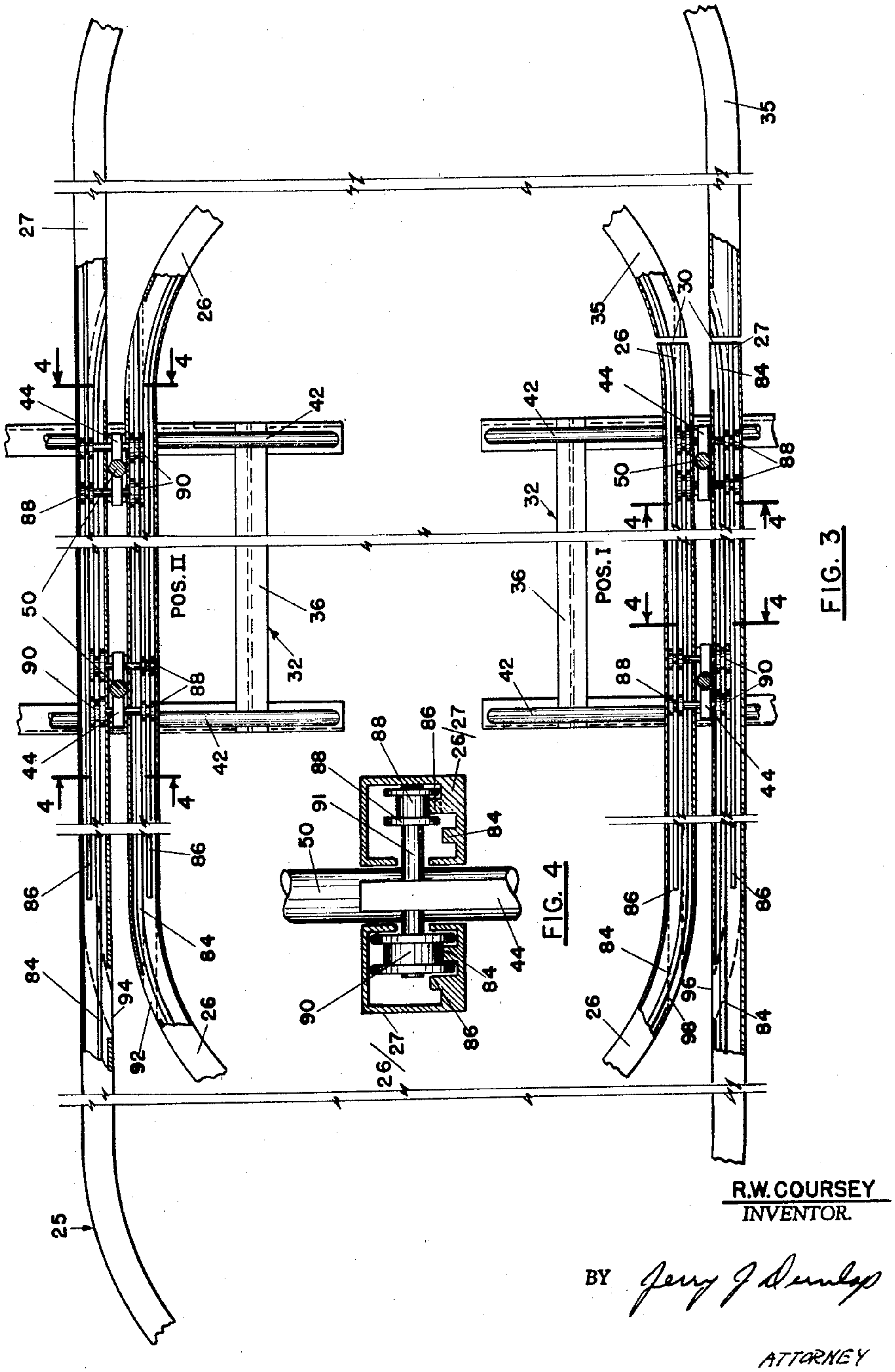
Figure 3 is a plan view of a portion of a typical loop construction, with the tracks of the loop partially broken away to illustrate the construction of the tracks and carriage supporting rollers.
Figure 4 is a typical sectional view through the tracks of a loop as taken along any of the lines 4—4 of Fig. 3.

Along the straight portion of each loop 25, as illustrated in Fig. 4, both of the tracks 26 and 27 are provided with two parallel rails 84 and 86 to receive the rollers 88 and 90 of the roller assemblies 44. Each pair of rollers 88 and 90 are secured on a shaft 91 carried by the respective roller assembly 44. It will be observed that the rails 86 extend higher than the rails 84 to receive the smaller rollers 88 of the roller assemblies, and that the higher rails 86 are positioned adjacent the inner periphery of the inner track 26 and the outer periphery of the outer track 27. The larger rollers 90 of the roller assemblies 44 engage the lower rails 84. It will also be observed that each of the rollers 88 and 90 is provided with end flanges to extend along the opposite sides of the respective supporting rail 84 or 86 and guide the rollers 88 and 90 along the rails 84 and 86. Each roller assembly 44 (see Fig. 3) is provided with two sets of rollers 88 and 90 to engage the higher rail 86 of one of the inner or outer tracks 26 or 27 while the opposite rollers are engaging the lower rail 84 of the other track 26 or 27 along the straight portion of the tracks. Furthermore, the roller assemblies 44 of each carriage 32 are turned in opposite directions; that is, the smaller rollers 88 of one roller assembly 44 of each carriage 32 engages the inner track 26 while the smaller rollers 88 of the other roller assembly 44 engage the outer track 27. The roller assemblies 44 are extended in opposite directions, and the rails 84 and 86 are shaped to facilitate the guiding of the carriages 32 around the opposite end portions of the respective loop 25.

In the upper portion of the loop 25 illustrated in Fig. 3, the carriage 32 shown in the drawing will be moving to the left when the carriages are circulated in a counter-clockwise direction around the loop 25. It will be observed that the larger rollers 90 of the roller assembly 44 at the leading end of the respective carriage 32 are supported on the lower rail 84 of the outer track 27; whereas the smaller rollers 88 of the leading roller assembly 44 are supported on the high rail 86 of the inner track 26. In moving the carriage 32 around the left end of the loop 25, the leading roller assembly 44 must follow the outer track 27. Therefore, the high rail 86 of the inner track 26 is terminated at the respective end of the straight section of the inner track 26. The small rollers 88 of the leading roller asembly 44 will then proceed in a straight line through the side of the inner track 26 as the larger rollers 90 are guided by the respective rail 84 of the outer track 27 beyond the curved portion of the inner track 26. In the event the track 26 is in the form of a channel-shaped member as illustrated in the drawings, an opening 92 is cut in the outer periphery of the inner track 26 to accommodate this outward movement of the small rollers 88. After the rollers 88 of the leading roller assembly 44 leave the inner track 26, the outer track 27 will support the respective end of the carriage 32 through the medium of the larger rollers 90. It will be understood that the roller assemblies 44 may be constructed with sufficient strength to provide this cantilever type supporting action. It may also be noted that the small rollers 88 are of a size to move over the top of a smaller rail 84 without interference, such that the leading roller assembly 44 may be easily moved out of the inner track 26 at the left hand end of the loop 25 illustrated in Fig. 3.

The trailing roller assembly 44 of the carriage 32 being moved counter-clockwise around the left hand end of the loop 25 must follow the inner track 26 to support the respective end of the carriage 32 while retaining the carriage 32 oriented in the same direction as when moving along the straight portion of the loop. Therefore, the larger rollers 90 of the trailing roller assembly must follow the respective lower rail 84 around the respective curved end of the inner track 26. On the other hand, the smaller rollers 88 of the trailing roller assembly 44 must be removed from the outer track 27 as the respective roller assembly is turned by the curved portion of the inner track 26. Therefore, the high rail 86 of the outer track 27 is terminated substantially even with the left hand end of the straight portion of the inner track 26 to permit a turning movement of the trailing roller assembly 44 at this point. It will again be noted that the smaller rollers 88 may be moved over the low rail 84 in the outer track 27 without interference. Another opening 94 is formed in the inner periphery of the outer track 27 substantially opposite the opening 92 in the inner track 26 for movement of the outer rollers 88 of the trailing roller assembly 44 therethrough. It will also be noted that when the smaller rollers 88 of the trailing roller assembly 44 are disengaged from the outer track 27, the respective larger rollers 90 support the respective end of the carriage 32 from the inner track 26.

From the foregoing it will be apparent that during movement of a carriage around the left end of the loop 25, the leading roller assembly 44 is guided by the lower rail 84 in the outer track 27 on a radius corresponding to the radius of the track 27. On the other hand, the rail 84 in the curved portion of the inner track 26 is curved on the same radius as the inner track 26 to guide the trailing roller assembly 44 during movement of the respective carriage 32 around the respective end of the loop 25. It will be remembered that the turn devices 78 and 79 retain the carriages 32 extended in the same direction during movement of the carriages around the curved end portion of the loop 25, and as will be more fully hereinafter set forth.

As the carriage 32 being moved in a counter-clockwise direction around the left hand end of the loop 25 approaches the straight portion of the inner track 26 shown in the lower portion of Fig. 3, the small rollers 88 of what was previously the trailing roller assembly 44 enter the outer track 27 through an opening 96 cut in the inner periphery of the outer track 27. As soon as the respective roller assembly 44 is straightened out to follow the straight portion of the loop 25, the respective small rollers 88 engage the large rail 86 in the outer track 27, whereby the respective end of the carriage is then supported by both the inner and outer tracks 26 and 27. Conversely, the small rollers 88 of what was previously the leading roller assembly 44 are directed through an opening 98 in the outer periphery of the inner track section 26 as the respective roller assembly approaches the straight portion of the inner track 26 shown in the lower portion of Fig. 3. The respective small rollers 88 pass over the small rail 84 in the inner track 26 and engage the large rail 86 in the inner track 26, whereby the respective end of the carriage 32 is also supported by both the inner and outer tracks 26 and 27.

It will be understood that as a carriage 32 is moved around either end of the loop 25, both of the roller assemblies 44 thereof are turned 180°, and what was formerly the leading roller assembly becomes the trailing roller assembly and what was formerly the trailing roller assembly becomes the leading roller assembly as the carriage is moved to the opposite side of the loop 25.

A detailed description of the inner and outer tracks 26 and 27 and the track sections 35 carried by the elevator 34 at the right hand end of the loop 25 is not believed necessary in view of the previous detailed description of the left hand end of the loop. The arrangement and termination of the rails 84 and 86 in the various tracks are substantially the reverse in the opposite ends of the loop 25, such that when the roller assemblies 44 are moved around the right hand end of the loop 25, the smaller rollers 88 are used to support the respective carriage 32 from the tracks 35 during substantially one-half of such movement of the carriage, and from the tracks 26 and 27 during the remaining one-half of the movement of the carriage arround the end of the loop 25. It may be noted, however, that the lower rail 84 in the outer track 27 and the respective outer track section 35 is curved adjacent the right hand end of the straight portion of the inner track 26 to facilitate turning of one of the roller assemblies 44 as the carriage is moved into or out of the respective curved end portion of the loop 25. It will further be understood that none of the carriages 32 may be moved around the right hand curved end of the loop 25 unless the elevator 34 is in a position to mate the opposite ends of the track sections 35 with the respective ends of the inner and outer tracks 26 and 27.

*Turn device*

Figure 6:
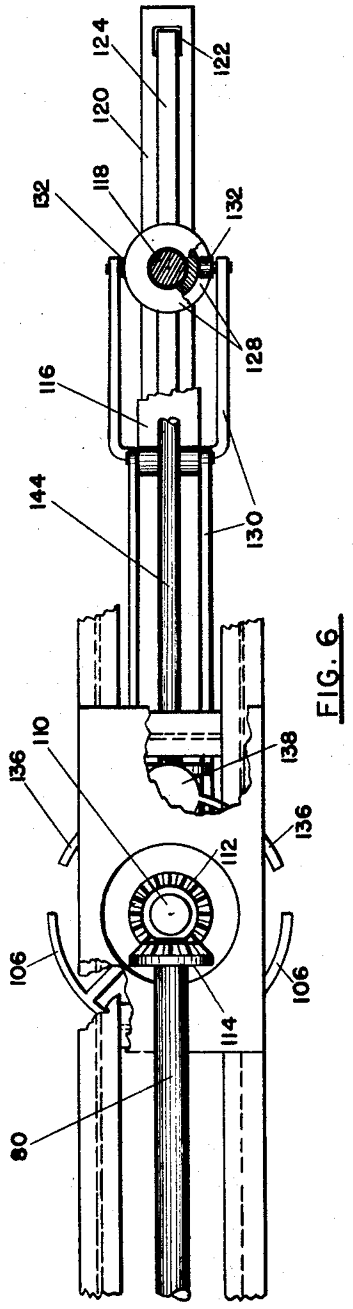
Figure 6 is a plan view of a typical turn device utilized in moving the carriages through the curved portions of the loops.
Figure 7:
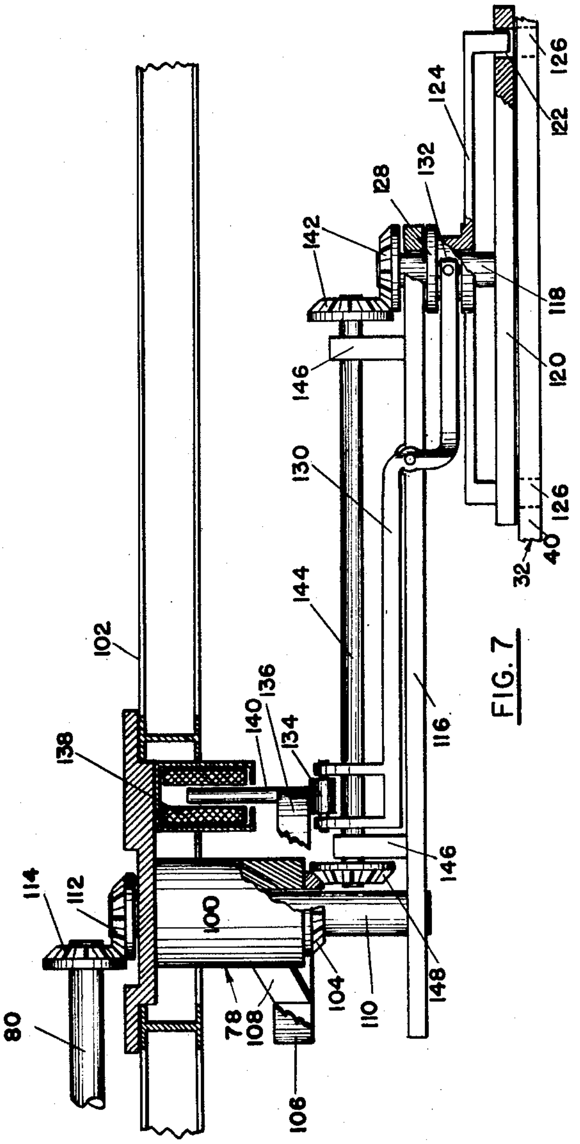
Figure 7 is an elevational view of a typical turn device, with portions of the structure shown in section to illustrate details of construction.

As illustrated in Figs. 6 and 7, each turn device 78 comprises a tubular shaped member 100 secured in a fixed vertical position by suitable supporting members 102 along the center line of the respective loop 25. A bevel gear 104 is secured on the lower end of the tubular member 100, and a semi-circular shaped cam 106 is supported by suitable bars 108 at the lower end of the tubular member 100 on the side of the member adjacent the curved end of the inner track 26 for purposes which will be hereinafter set forth. A shaft 110 is journaled in the tubular member 100 and is suitably secured in a fixed vertical position by any suitable means (not shown) such that the shaft 110 may rotate but not move vertically. A bevel gear 112 is secured on the upper end of the shaft 110 to mate with a similar bevel gear 114 secured on the outer end of the respective shaft 80 extending from the main drive shaft 58, as described in connection with Fig. 1B.

An arm 116 is rigidly secured on the lower end of the shaft 110 and is of a length to extend outwardly over the central portion of a carriage 32 being moved around the respective end of the loop 25. Another shaft 118 is journaled in the outer end of the arm 116 and has an elongated guide member 120 rigidly secured on the lower end thereof. A pair of spaced apertures 122 are formed vertically through the guide 120 to receive the opposite, downwardly extended ends of a latching member 124. Mating apertures or bores 126 are formed in the top member 40 of each carriage 32 along the center line of the carriage to receive the downwardly extended ends of the latching member 124 for propelling the carriages 32 around the respective end of the respective loop 25 and retaining the orientation of the carriages, as will be more fully hereinafter set forth.

The latch 124 is rigidly secured on the lower end of a hub 128 which in turn is slidingly disposed on the shaft 118, such that the latch 124 may be moved vertically with respect to the shaft 118 and the outer end of the arm 116. A lever 130 is pinned to the hub 128 and a medial portion of the arm 116 and extends inwardly toward the inner end of the arm 116. It will be apparent that when the lever 130 is pivoted counter-clockwise (as viewed in Fig. 7) the hub 128 will be moved upwardly on the shaft 118 and the latch 124 will be moved upwardly in the guide 120. It will also be observed that the outer end portion of the lever 130 is bifurcated and provided with opposed rollers 132 which extend into an annular groove around the hub 128, such that the latch 124 and hub 128 may be turned with respect to the arm 116 and yet the lever 130 will remain in engagement with the hub 128 to actuate the latch 124.

A roller 134 is secured to the inner end of the lever 130 to contact the previously described cam 106 and another semi-circular shaped cam 136 extending around the tubular member 100 opposite the cam 106. As will be observed in Fig. 6, the cam 136 extends through an arc less than 180° to provide spaces between the adjacent ends of the cams 106 and 136. The radius of each of the cams 106 and 136 is, of course, equal to the distance between the center line of the shaft 110 and the roller 134, such that the roller 134 will sequentially contact the cams 106 and 136 during turning of the arm 116 with respect to the tubular member 100. A solenoid 138 is secured to the supporting structure 102 above the cam 136 and receives a shaft or core 140 secured to the upper end of the cam 136. The solenoid 138 operates to raise the core 140 and the cam 136 when the solenoid is energized and operate the latch 124, as will be described.

Bevel gears 142 are secured on the upper end of the shaft 118 at the outer end of the arm 116 and on the outer end of a shaft 144 rotatably secured on the arm 116 by suitable bearings 146. The inner end of the shaft 144 is provided with a bevel gear 148 of a size to mate with the bevel gear 104 rigidly secured on the lower end of the tubular member 100. It will thus be apparent that when the arm 116 is turned by rotation of the driving shaft 80, the shaft 144 will be moved in the same direction to roll the bevel gear 148 around the bevel gear 104 on the stationary tubular member 100. This engagement of the gears 104 and 148 provides rotation of the shaft 144 which is in turn transmitted through the bevel gears 142 to the vertical shaft 118 and the guide member 120 to turn the latch 124 relative to the arm 116 during pivoting movement of the arm 116. It will also be observed that when the bevel gears 104 and 148 are the same size, and the bevel gears 142 are the same size, the latch 124 will be extended in the same direction in all positions of the arm 116. Therefore, when the latch 124 engages the top member 40 of the carriage 32 and moves the carriage around a curved end portion of the loop 25, the carriage 32 will be retained oriented in the same direction as when the latch 124 originally engaged the carriage.

Figure 5:
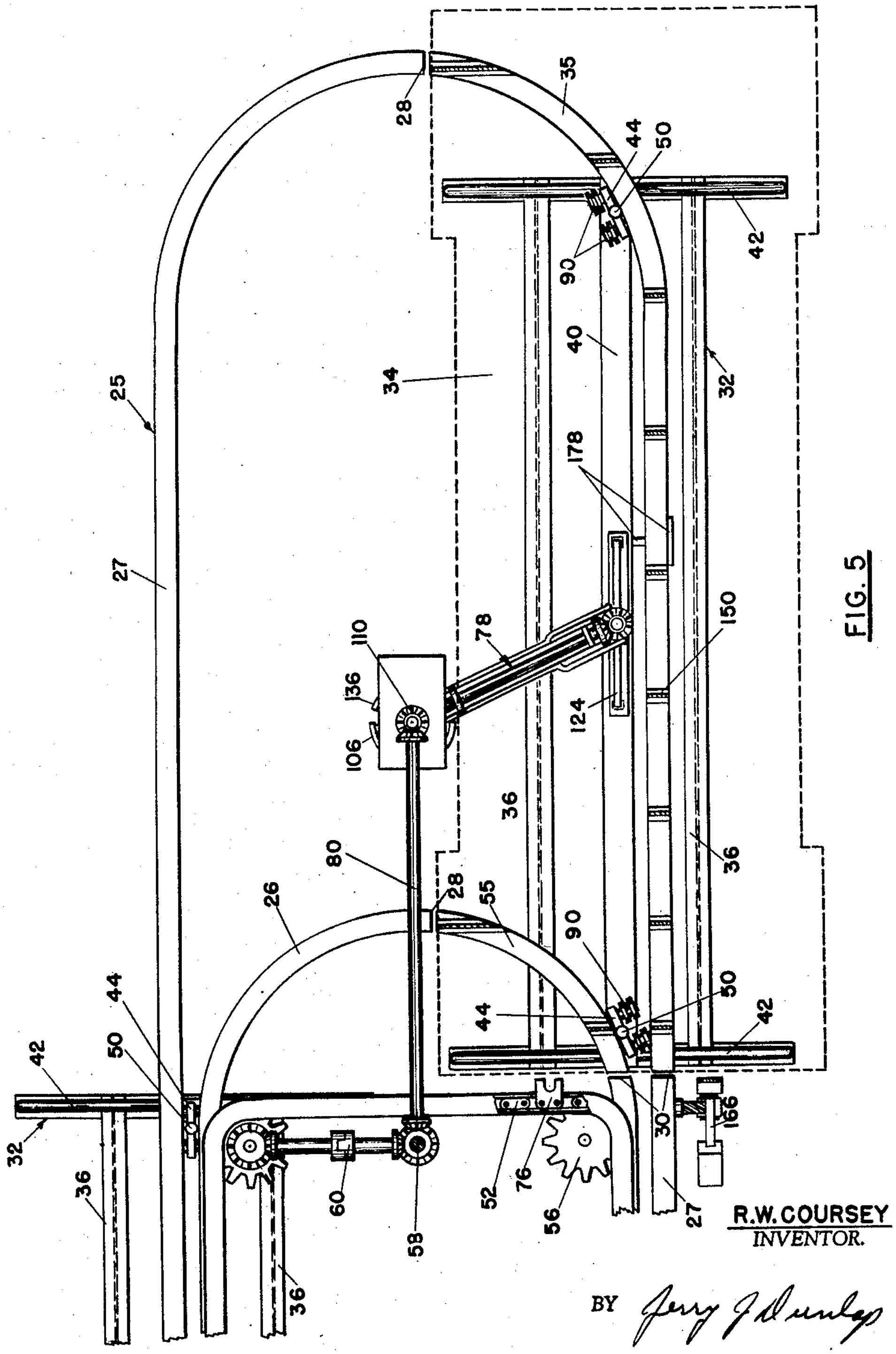
Figure 5 is a plan view of one end of a track loop illustrating a carriage positioned in the elevator shaft extending through the respective loop.

The cams 106 and 136, as previously indicated, control the latching and unlatching movements of the latch 124. The cam 106 is secured at such a height that when the arm 116 is extended generally inwardly with respect to the loop 25, the roller 134 will be in contact with the lower face of the cam 106 to raise the latch 124 in the guide 120 to such an extent that the latch 124 cannot engage a carriage 32. For example, any time the turn device 78 as shown in Fig. 5 is extended to the left of the shaft 110, the respective latch 124 will be raised to prevent engagement of the latch with any carriage 32. Also, the lower face of the cam 106 may be tapered at the opposite ends of the cam to facilitate movement of the roller 134 under the cam.

Assuming that the turn device 78 shown in Fig. 5 is being turned in a counter-clockwise direction, as soon as the turn device is extended at approximately 90° from the driving shaft 80 toward the lower end of the drawing, the roller 134 will be moved out from under the cam 106 and the weight of the latch 124 and hub 128 will move the roller 134 upwardly in the space between the ends of the cams 106 and 136 and the latch 124 is lowered through the guide 120 for engagement with a carriage 32 being moved into the respective curved end portion of the loop 25 by the driving chain 52 as previously described. If the solenoid 138 is energized to raise the cam 136, the latch 124 will remain in engagement with the respective carriage 32 and propel the carriage counter-clockwise around the respective curved end portion of the loop 25 while simultaneously retaining the carriage 32 oriented in the same direction.

At any time during the movement of the carriage 32 around the curved end portion of the loop 25 at the elevator end of the loop, the solenoid 138 may be de-energized and release the core 140. At this time the cam 136 will drop by its own weight to contact the roller 134 and pivot the inner end of the lever 130 downwardly. This movement raises the latch 124 in its guide 120 and releases the latch 124 from the respective carriage 32. The turn device 78 may then be turned from above the carriage 32 and moved from its position over the carriage 32. It may also be noted that the cam 136 is of a length to actuate the lever 130 when the turn device 78 is turned at an angle to position a carriage 32 on the elevator 34, such that the latch 124 may be engaged or disengage from a carriage 32 when the carriage is on the elevator. The cam 136 extends on around the shaft 110 to a position for releasing the latch 124 from the carriage 32 when the carriage has been moved on around the respective end portion of the loop 25 to a position clear of the elevator 34, which is one of the basic storage positions, as will be more fully hereinafter set forth. It should also be kept in mind that all of the turn devices 78 of each system are rotated simultaneously when the motor 59 is operated, and such movement is in timed relation to the movement of the driving chains 52 and 54.

The turn devices 79 (Fig. 1A) at the opposite ends of the loops 25 are constructed in the same manner as the turn devices 78, except that the turn devices 79 do not have the cams 136, solenoids 138 and cores 140 shown in Figs. 6 and 7. Thus, the latch 124 of each turn device 79 will be in latching position at all times the respective roller 134 is clear of the respective cam 106. It will also be noted that each turn device 79 (Fig. 1A) is driven by the respective chains 52 and 54, such that each turn device 79 will turn only when the respective chains 52 and 54 are driven, to move carriages around the respective end of the loop 25.

*Elevator*

Figure 8:
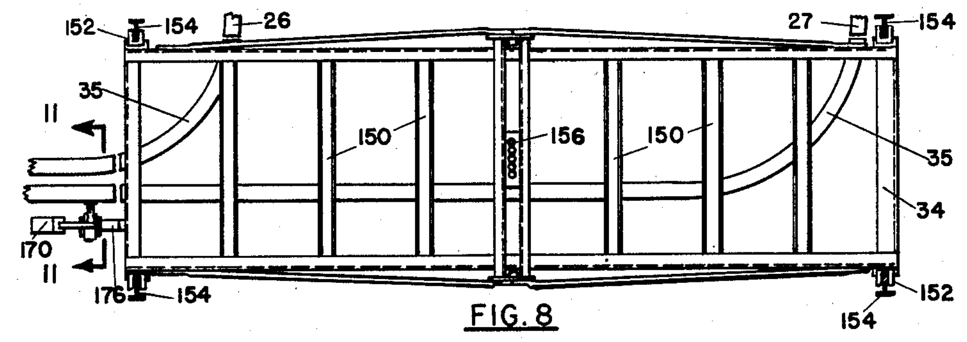
Figure 8 is a plan view of a typical elevator which may be used in the present system.
Figure 9:
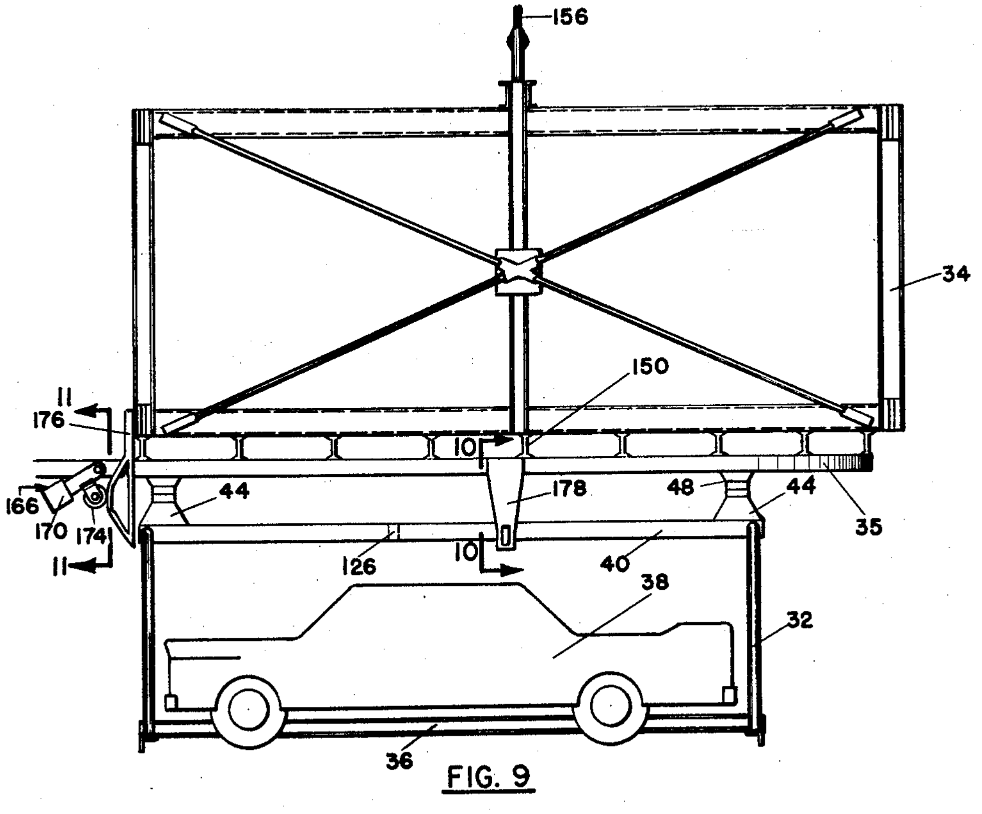
Figure 9 is an elevational view of an elevator with a carriage suspended therefrom.
Figure 11:
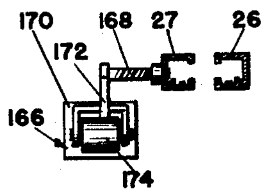
Figure 11 is a sectional view as taken along lines 11—11 of Fig. 9.
Figure 12:
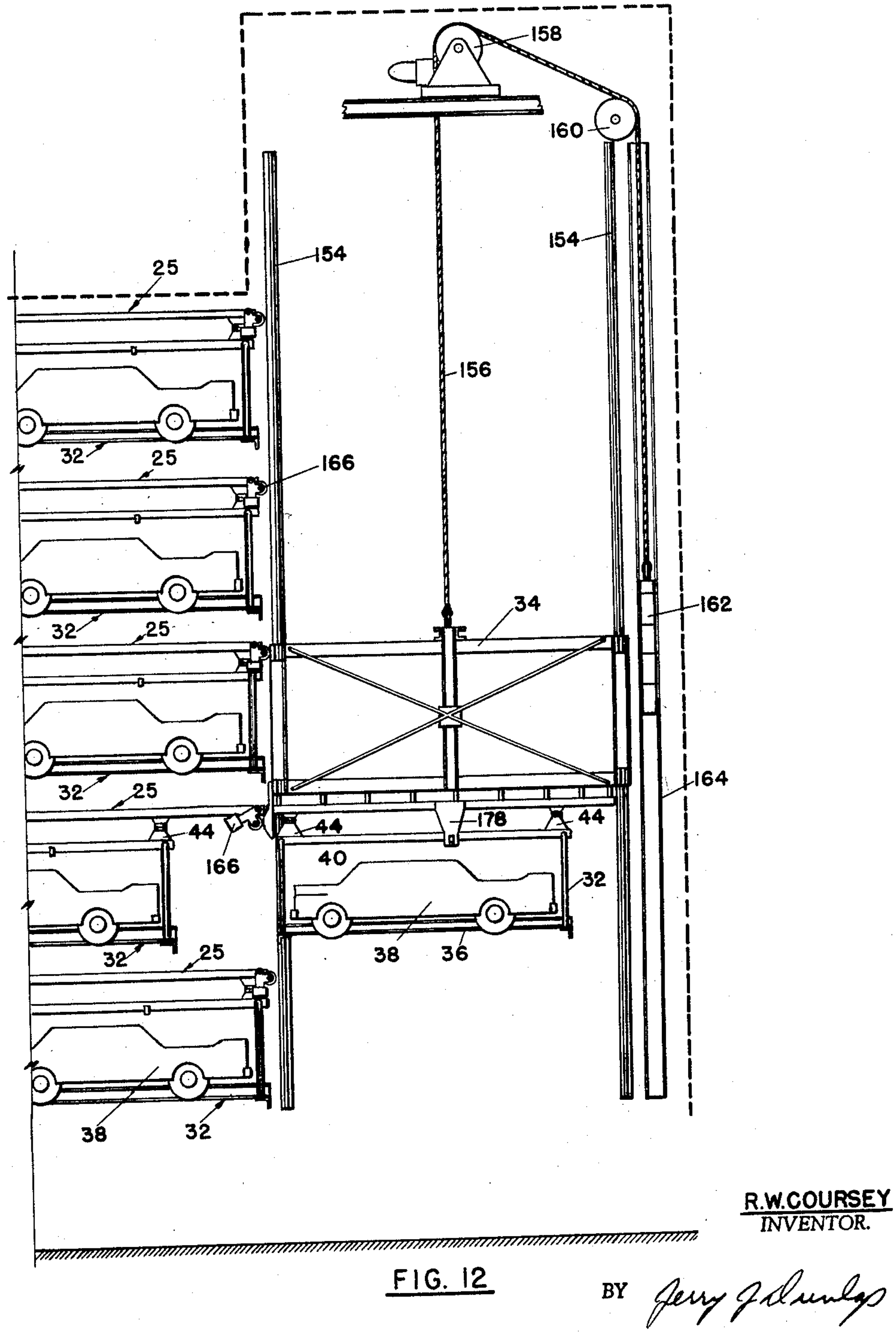
Figure 12 is an elevational view of one end portion of a system constructed in accordance with this invention illustrating the construction and operation of the elevator.

As illustrated in Figs. 8 and 9, the elevator 34 may be a conventional freight elevator of generally rectangular configuration and having a series of cross braces 150 on the bottom thereof to which the track sections 35 are rigidly secured. Slide members 152 are secured on the four corners of the elevator 34 to receive guides 154 extending vertically throughout the height of the system. The guides 154 at each end of the elevator shaft are spaced apart a sufficient distance that an automobile 38 may be driven therebetween at either end of the elevator, and the guides 154 at each side of the shaft are spaced apart a sufficient distance that a carriage 32 may be moved sideways through the guides 154 at any loop level. The guides 154 define an elevator shaft extending through each of the loops 25 of a complete parking system, such that the elevator 34 may be raised and lowered in the elevator shaft to a position opposite any of the loops 25 of a system. The elevator 34 is raised and lowered by suitable cables 156 extending downwardly from a driving elevator motor 158 as illustrated in Fig. 12. The cables 156 extend from the motor 158 over an idler pulley 160 to a counter-weight 162 retained in a suitable guide 164 at one side of the elevator shaft. It will be apparent that the counter-weight 162 reduces the force required to raise the elevator 34 with an automobile 38 supported therefrom, as well as facilitates the lowering of the elevator 34.

As previously indicated, a carriage 32 is moved into the elevator shaft only when the elevator 34 is in such a position that the tracks 35 thereof mate with the inner and outer tracks 26 and 27 of the loop 25 from which the carriage is supported. However, to assure that a carriage 32 does not inadvertently roll into the elevator shaft, I prefer to provide a safety device 166 at each track loop 25 adjacent the elevator shaft as illustrated in Figs. 8, 9, 11 and 12. Each safety device 166 (see Fig. 11) comprises a bolt 168 threaded through one side of the outer track 27 by means of coarse threads, such that only a slight rotation of the bolt 168 will move the bolt a substantial distance into the respective track 27 and prevent movement of a carriage roller assembly 44 through the track 27. A counter-weight 170 is secured by an arm 172 to the outer end of the bolt 168 in such a manner as to constantly tend to thread the bolt 168 into the track 27. In other words, when the counter-weight 170 is extended downwardly, the bolt 168 is threaded into the track 27. A roller 174 is carried by the arm 172 in such a position to be contacted by a bracket 176 carried by the elevator 34 (Fig. 9).

When the elevator 34 is moved to such a position that its tracks 35 mate with the tracks 26 and 27 of a particular loop 25, the bracket 176 contacts the roller 174 and pivots the arm 172 in a direction to unthread the bolt 168 from the respective track 27. Thus the bolt 168 is withdrawn from the track 27 when the elevator 34 is in carriage receiving position, such that a carriage 32 can be moved from the tracks 26 and 27 onto the tracks 35 of the elevator. One of these safety devices 166 is provided at each loop 25 on the side of the elevator shaft into which the carriages 32 are ordinarily moved. It will also be understood that a similar safety device may be provided on the opposite ends of the tracks 26 and 27 to assure that a carriage 32 will not be inadvertently rolled into the elevator shaft in either direction from the tracks 26 and 27.

Figure 10:
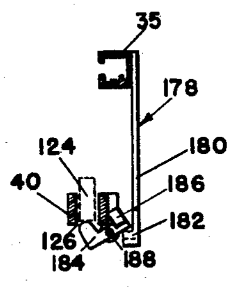
Figure 10 is a sectional view as taken along lines 10—10 of Fig. 9.

I also prefer to provide a latching device 178 for securing a carriage 32 on the elevator 34 to prevent the carriage from inadvertently rolling off of the track sections 35 of the elevator. This latching device 178 is illustrated in detail in Fig. 10 and comprises an arm 180 extending downwardly from one of the track sections 35 opposite one of the apertures 126 in the top member 40 of a carriage 32 when the carriage is in the proper position with respect to the elevator 34. The lower end of the arm 180 is provided with notches 182 to receive a pawl 184 pivotally secured on the top member 40 of each carriage 32. The pawl 184 is provided with a finger at one end thereof normally held in one of the apertures 126 of the respective top member 40 by a small counterweight 186 on the opposite end of the pawl. When the latch 124 of a turn device 78 is engaged with the top member 40 of the respective carriage 32, the latch 124 pivots the pawl 184 on its pin 188 to raise the opposite end of the pawl 184 above the notch 182 in the respective arm 180 of the latching device 178. When the carriage 32 is properly positioned on the elevator 34, the latch 124 of the turn device is raised to provide a clockwise pivoting of the pawl 184 and lower the outer end of the pawl into the notch 182 in the lower end of the respective arm 180. It will then be observed that the pawl 184 will provide a lock between the carriage 32 and the elevator 34 to prevent rolling of the carriage 32 with respect to the elevator.

*Operation*

A more detailed description of the operation of the present system is best illustrated by reference to Fig. 13 wherein I have designated the various carriages 32 of a loop 25 with letter suffixes to more clearly illustrate and describe the various movements of carriages around the loop. The operation of the present system is such that all of the carriages on each loop 25 are retained in the same sequence, that is, each carriage 32 is always positioned between two other specific carriages to maintain the same relationship between the relative positions of the carriages, regardless of the position of the carriages with respect to the loop 25. Therefore, the carriages 32 may be designated 32A, 32B, etc., around the loop 25 and they will retain this arrangement throughout the movement of the carriages around the loop.

Figure 13:
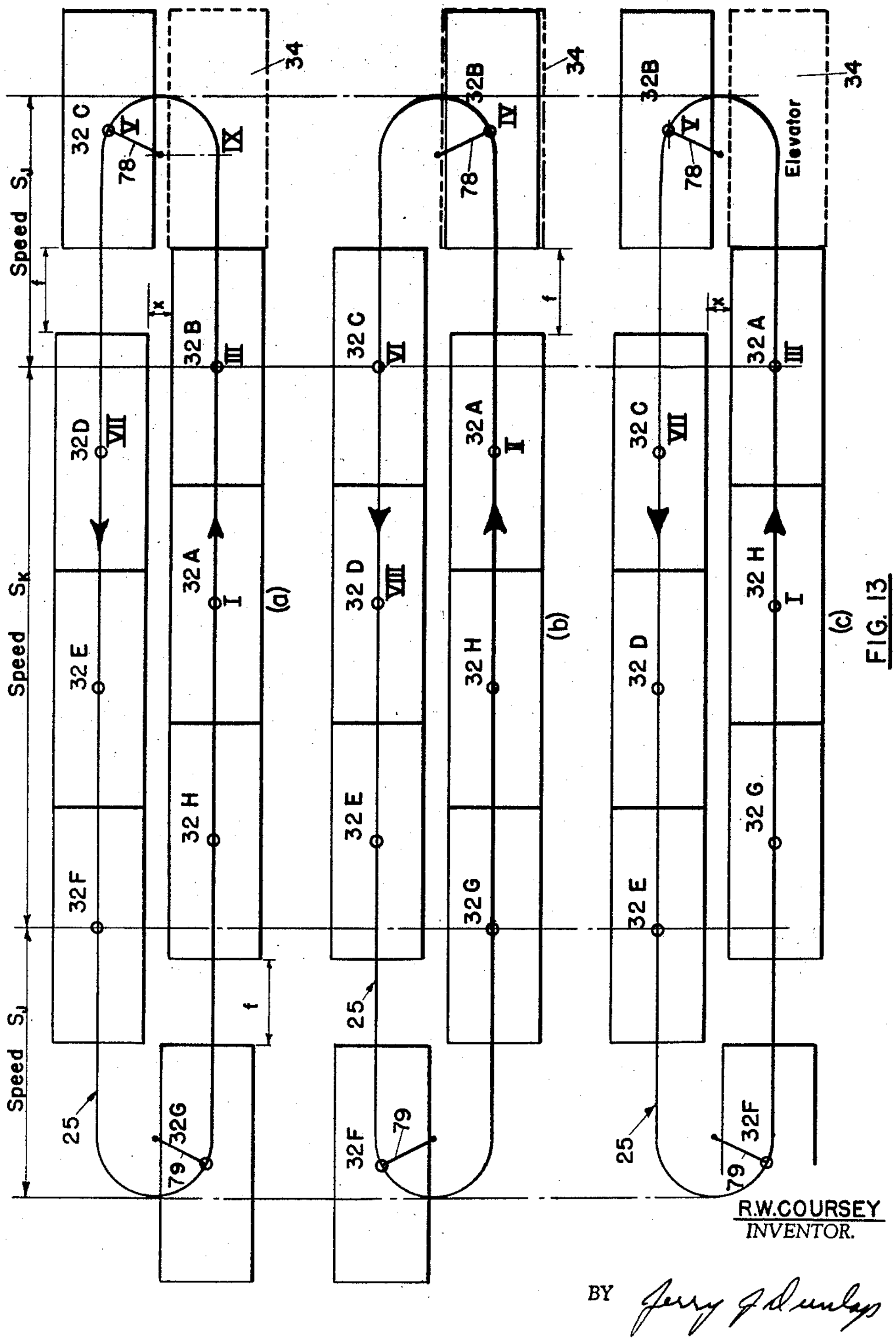
Figure 13 is a schematic drawing illustrating the movement of carriages around a typical loop, with the (*a*) and (*c*) portions of the figure illustrating normal storage positions of carriages in a loop, and portion (*b*) of the figure illustrating a typical position of carriages in a loop when one of the carriages is engaged by the elevator for a loading or unloading operation.

In the operation of the present system, the carriages 32 will normally occupy the positions in each loop 25 as illustrated in Fig. 13(*a*), with no carriage in a position to interfere with vertical movement of the elevator 34. That is, when no carriage from a loop is being loaded or unloaded, the carriages on the loop are arranged as illustrated in Fig. 13(*a*).

With the elevator 34 in position opposite a loop 25, the carriages 32 of the loop may be circulated in either direction, as previously noted. Assuming the carriages are aranged as illustrated in Fig. 13(*a*), the carriage 32A may be considered as in position I. During movement of carriage 32A from position I to position II, as illustrated in Fig. 13(*b*), carriage 32B is moved from position III to position IV where the carriage 32B will be supported solely by the elevator 34. At the same time, carriage 32C is moved from position V to position VI. It will be observed that in this movement of the carriages 32A, 32B and 32C, carriage 32B moves farther than carriage 32A to provide a space *f* between the adjacent ends of the carriages 32A and 32B and assure that the carriage 32A will not interfere with vertical movement of the elevator 34. Also, carriage 32C is moved the same distance as carriage 32B, that is, the length of a carriage plus a distance *f*, to assure that the carriage 32C will not interfere with a further counterclockwise movement of carriage 32B, as illustrated in Fig. 13(*c*). It will be further noted that the right hand end of carriage 32C is about even with the left hand end of carriage 32B in Fig. 13(*b*) to utilize the maximum portion of the length of the loop 25 and still prevent the carriages from coming into contact during movement around the curved ends of the loop. The loop 25, as previously noted, is preferably of a size to space the sides of the loop apart only a sufficient distance for simultaneous movement of carriages along both sides of the loop with clearance between the sides of the carriages for supporting structure, in order to use the maximum available space for storage of the carriages.

In the event carriage 32B is not moved by the elevator 34, or when it is returned to the loop by the elevator, the carriages 32 may be moved on counter-clockwise around the loop. The carriage 32B is therefore moved to position V, as illustrated in Fig. 13(*c*), while carriage 32A is being moved from position II to position III and carriage 32C is being moved from position VI to position VII. This operation completes a movement of the carriages between successive basic storage positions, that is, a movement of the carriages from the positions shown in Fig. 13(*a*) to the positions shown in Fig. 13(*c*). For such a movement it will be noted that each turn device 78 and 79 is turned one complete revolution so that a carriage in an end portion of the loop is moved a substantially greater distance than a carriage supported along a side of the loop. It will thus be apparent that the speed of the turn device latches must be greater than the speed of the center driving chain 54. Also, the speed of the end driving chains 52 should be about the same as the speed of the turn devices to assure that the carriages will not be knocked together in the ends of the loop. The portions of the loop 25 through which the carriages are moved at the lower speed is graphically shown in Fig. 13 by the line marked "Speed S*k*," while the portions of the loop through which the carriages are moved at the higher speed are shown by the lines marked "Speed S*j*." When using carriages of a size to hold automobiles, that is, measuring about 8 ft. by 20 ft., and maintaining the distance *x* between carriages traveling along the sides of the loop at about 2 ft., the speed S*j* is about 1.57 times the speed S*k*, and the distance *f* is about 7.26 ft.

As previously noted, and as indicated in Fig. 12, a complete automobile parking system will comprise several of the loops 25 extending from the elevator shaft in vertically spaced relation above street level. Each loop 25 may be considered at a floor level, with the lower loop at the second floor, the next higher loop at the third floor, etc. The first floor level at the lower end of the elevator shaft defines a parking and unparking station. Inasmuch as the system will ordinarily be idle awaiting a car to be parked, the preferred operation is to have one of the carriages 32 positioned at the parking and unparking station. The loop 25 from which the lowered carriage is taken will have the remaining carriages thereof arranged as shown in Fig. 13(*b*). The carriages on the remaining loops will be arranged in their basic positions as illustrated in Figs. 13(*a*) and 13(*c*).

When an automobile is driven onto the lowered carriage 32, the carriage is moved upwardly by the elevator 34 to the loop 25 from which the carriage was removed. The removed carriage will then be in the position of carriage 32B in Fig. 13(*b*). The turn devices 78 are then turned by the main motor 59 until the turn device 78 of the respective loop is moved to a position over the carriage in the elevator. If another empty carriage is to be returned to the parking and unparking station, the solenoid 138 is energized to actuate the latch 124 and the respective clutch 60 is engaged. Since the carriage 32 may be moved in either direction around the loop 25, the motor 59 is operated to drive the chains 52 and 54 and turn devices 78 and 79 in a direction to move the closest empty carriage of the respective loop onto the elevator 34. When such empty carriage is on the elevator 34, the solenoid 138 and clutch 60 are de-energized to stop the chains 54 and 52 and unlatch the turn device 78 from the respective empty carriage. However, the main motor 59 is continued in operation to move the turn device 78 to the position shown in Figs. 13(*a*) and 13(*c*) where, it will be noted, the turn device 78 is clear of the elevator shaft. It should also be noted that it is convenient to simultaneously turn all of the turn devices 78 in a system to minimize control of the system. Therefore, all of the turn devices 78 in the elevator ends of the loops are now clear of the elevator shaft and the previously described empty carriage is lowered to the parking and unparking station.

When it is desired to unpark an automobile stored in the system, and an empty carriage is at the parking and unparking station, the empty carriage is returned to its respective loop 25. Thereupon, the carriages in the respective loop 25 are moved, as described in connection with the description of carriage movements from those shown in Fig. 13(*b*) to those shown in Fig. 13(*c*), such that the elevator shaft will then be completely free. The elevator 34 is then moved to the loop 25 containing the desired automobile. Upon arriving at the last-mentioned loop, the respective carriages 32 are circulated around the loop in the manner previously described until the carriage containing the wanted automobile is positioned on the elevator. Whereupon, the respective turn device 78 is unlatched and turned to clear the elevator shaft, and the elevator is lowered to move the wanted automobile to the unparking station. After removing the automobile from its respective carriage, the now empty carriage is left in the parking and unparking station until either another automobile is to be parked, or it is desired to unpark another automobile stored in the system.

In the event a customer requests his automobile which is stored in the system while another automobile is being parked, the parking operation is first completed to free the elevator 34. The elevator is then moved to the loop containing the requested automobile and the unparking operation is carried out as described above.

*Control system*

It will be apparent that the operation of the main motor 59, solenoids 138, clutches 60, and elevator motor 158 could be operated manually by suitable controls at a central location. However, manual control would be intricate and the parking and unparking operations would no doubt be slower than necessary. I therefore contemplate an automatic electrical control system as illustrated in Figs. 14 through 23 and as described below.

Before proceeding with a detailed explanation of the preferred control system, it would be well to note that such a system may be in the command of an operator or operators who park the automobiles on the carriages, unpark automobiles from carriages, and issue parking receipts in substantially the same manner as present day parking hotels and the like. However, it is desirable to make the system completely automatic and not have an attendant drive the customers' automobiles. For a completely automatic system, a switch key system is very useful, wherein the customer may drive his automobile on a waiting carriage, leave the automobile, and remove a key from a conveniently located switch board; whereupon the automobile is automatically parked. The customer then retains the key in his possession as a receipt. When desiring his automobile, the customer inserts his key in a specified switch or receptacle, and the automobile is automatically brought to the street level where the customer can drive off. It is also desirable to include a memory system, such that several requests for automobiles may be stored and the automobiles unparked in the order in which the requests are made. These features and components of the system are described in detail below.

*Main power equipment and limit switches*

Figure 15:
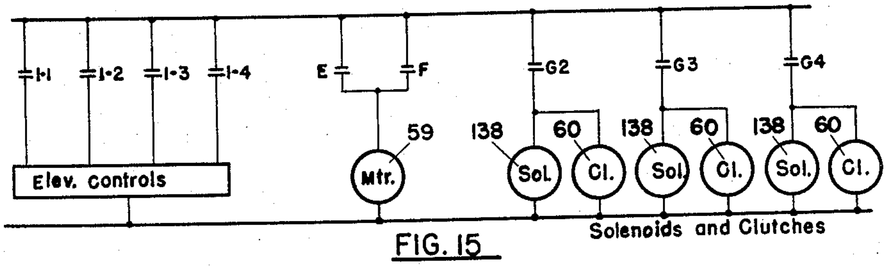
Figure 15 is a one-line schematic of the main electrical equipment in the preferred embodiment of this invention.

The electrical arrangement of the main motor 59, solenoids 138, clutches 60 and elevator controls is illustrated in Fig. 15. Since a conventional automatic high speed freight elevator with its own controls is proposed, the I contacts, when closed, initiate the sequence that starts the elevator and stops it at the proper loop 25. The E and F contacts are those of a reversing motor contactor, E forward and F reverse.

As previously noted, at each loop, an electric clutch 60, when energized, connects the drive chains 52 and 54 and turn device 79 to the main drive shaft 58. The turn device 78 is turned whenever the main drive shaft 58 is rotated. Also, solenoid 138, when energized, latches the respective turn device 78 to a carriage 32. The operating procedure is such that the clutch and solenoid for each loop must always be energized or de-energized together.

The G contacts energize the solenoid and clutch for the particular loop called for.

Certain limit switches (see Figs. 14, 17 and 21–23) should be mentioned at this point. Switches *x*1, *x*2, *x*3 and *x*4 are closed when the elevator 34 rests at the respective first, second, third and fourth floor levels.

Switch *xi* is closed when the turn devices 78 are in the base position, i.e., position V, Figure 13(*a*). The turn devices 78 at all floors turn together, as previously noted.

Switch *xj* is closed when the respective turn device 78 is in the elevator position, i.e., position IV, Figure 13(*b*).

Switch *y*2, *y*3, or *y*4 is closed when a carriage is in position VI, Figure 13(*b*). The respective limit switch is open when no carriage is in position VI, as in the case of the base carriage positions shown in Figure 13(*a*).

*Preliminary operation*

Figure 14:
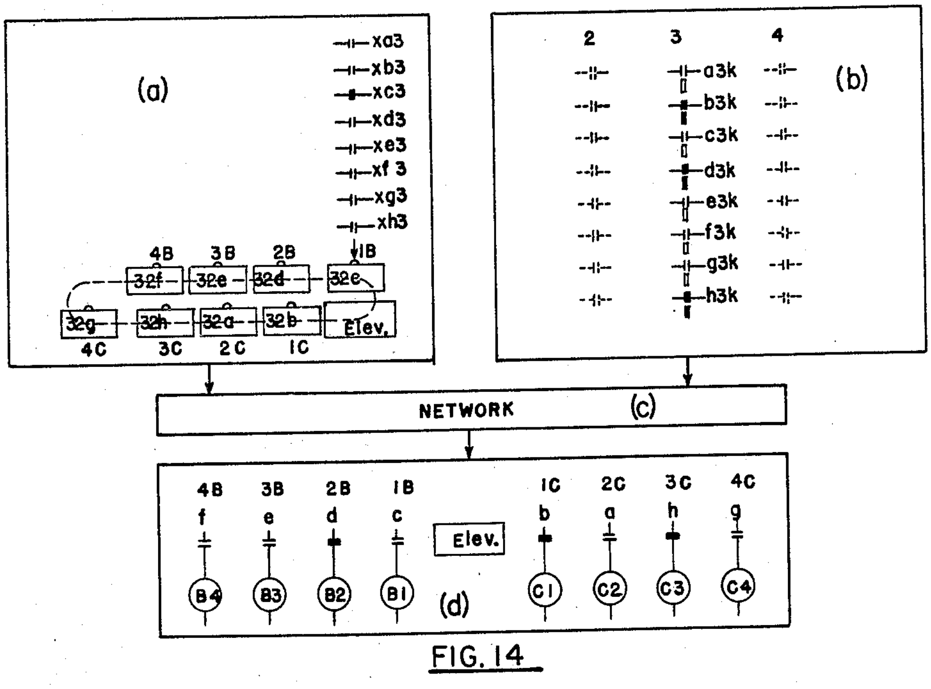
Figure 14 is a operational diagram of the switching network for the control system of the present invention, with portions of the diagram marked (*a*), (*b*), (*c*) and (*d*) for clarity of explanation.

Each carriage on a given floor has a distinguishing limit switch operator which, when that particular carriage is in a certain position, operates a matching limit switch. At a certain station on each floor, these limit switches are grouped together, one for each carriage and operable only by that specific carriage operator. Each such floor arrangement of operators and limit switches is identical with every other floor. An arrangement is shown in Fig. 14(*a*) wherein eight carriages designated 32*a*, 32*b*, 32*c*, 32*d*, 32*e*, 32*f*, 32*g*, and 32*h* are in base position. The designations above and below the loop indicate the carriage base stations, with the numbers indicating distance from the elevator and the letter indicating the half of loop. Some of the stations 1B, 2B, etc., correspond to the positons described in connection with Fig. 13, as will be noted below. However, some of these stations do not correspond to the previously described positions, hence the use of different reference characters. Station 1B in this example is the location of the limit switches, which are designated *xa*3, *xb*3, etc. *x* designates function; *a*, *b*, etc., the carriage the limit switch is associated with, and 3 the floor level. Since carriage 32*c* is shown at the station, limit switch *xc*3 is shown operated.

An identical set of limit switches are at the ground floor, and will be closed by any *a*, *b* or *c* carriage with matching operator at the ground floor. In this case these limit switches will be designated as *xa*1 through *xh*1.

Figure 17:
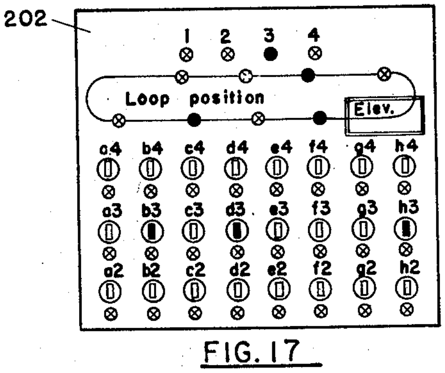
Figure 17 is a schematic elevational view of a facsimile board which may be used with the present system.
Figure 16:
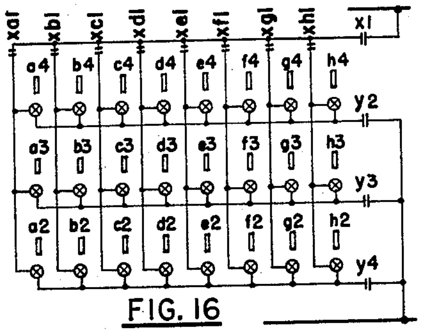
Figure 16 is a one-line schematic of the electrical connections to the keyboard indicating lamps of the preferred embodiment.

Fig. 16 shows the connections to pilot lights located at each switch-key position. The pilot light at the key location associated with the carriage at the ground floor will be illuminated by completing the electrical circuit through closing of the proper limit switch *xa*1, *xb*1, etc., and limit switch *y* at the floor where the carriages are arranged as in Fig. 13(*b*). These pilot lights are also shown in Fig. 17.

Figure 18:
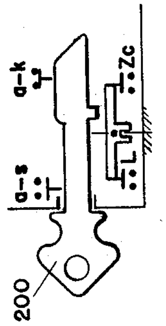
Figure 18 is a schematic illustration of a switch key, and the switches operated thereby, in the preferred control system.
Figure 21:
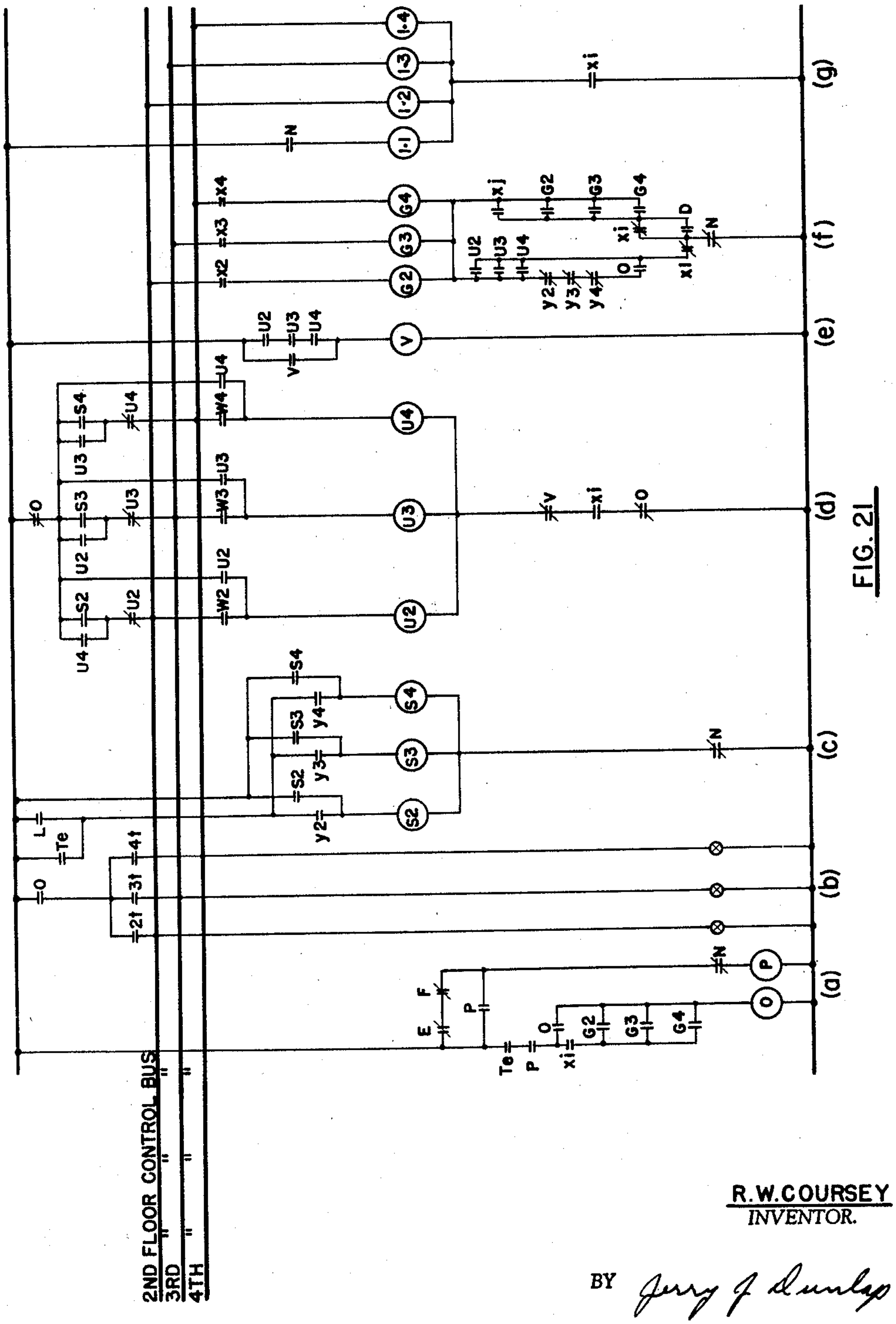
Figure 21 is a schematic wiring diagram of the floor control buses for the various loops, the elevator controls, and the turn device latching controls, with portions of the diagram designated (*a*), (*b*), etc., to facilitate description of the system.

When an automobile is driven onto a carriage at the ground floor, the driver removes the illuminated key and leaves. Figure 18 shows that removal of the key 200 opens the *a–k* contacts associated with that key and momentarily closes L contacts. In Fig. 21 it can be seen that momentarily closing the L switch closes the circuit to an S relay for a floor selected by the *y* contact that happens to be closed. This, of course, will be the one for the floor out of base arrangement and to which the now loaded carriage belongs. The S relay seals itself in and closes the supply to the control bus for that floor through normally closed *u* and *o* contacts to be described later.

Figure 22:
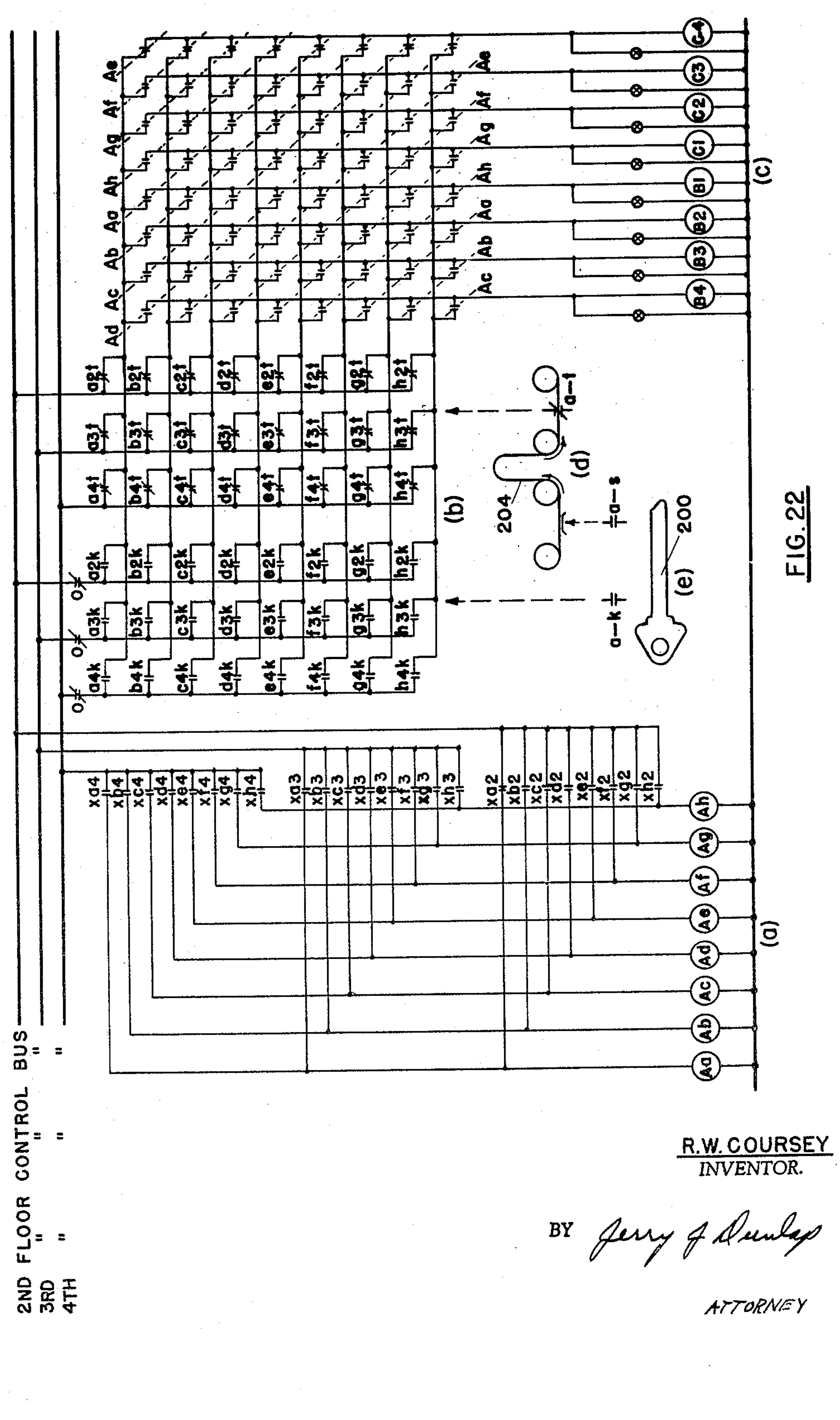
Figure 22 is a schematic diagram of the loaded carriage selection circuit, the empty carriage information circuit, the carriage position circuit, and the switching network for energizing the various drives, elevator and turn device controls, with portions of the diagram designated (*a*), (*b*), etc., to facilitate description of the diagram.
Figure 23:
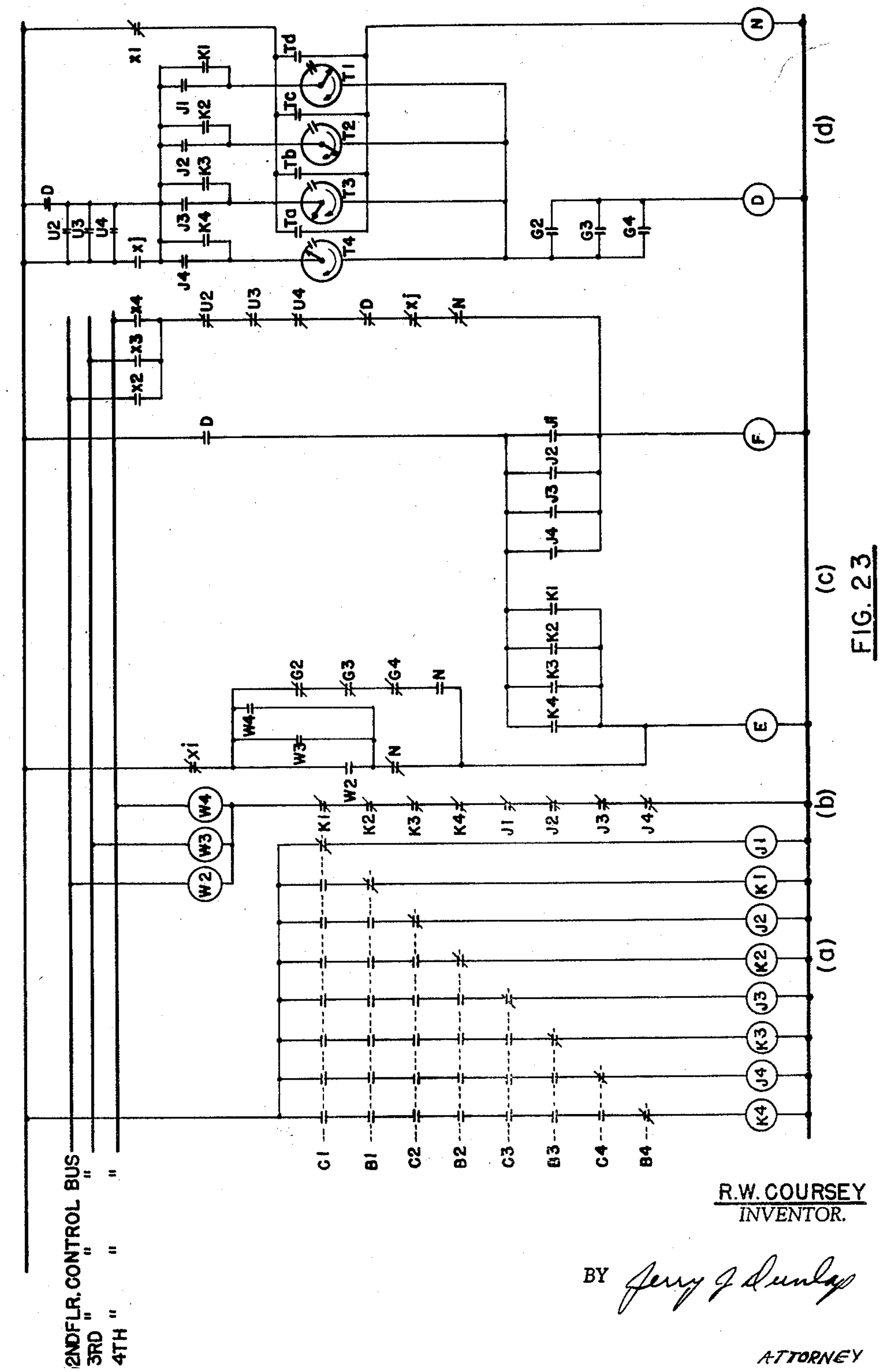
Figure 23 is a schematic diagram of the carriage selection relays, main motor controls, and timer relays used in controlling the movement of carriages around a loop, with portions of the diagram designated by (*a*), (*b*), etc., to facilitate description of the diagram.

Now that the proper floor control bus is energized, everything connected to that bus becomes energized as shown in Figs. 21, 22 and 23. The proper elevator control is operated through an I relay, Fig. 21(*g*), to cause the elevator to move to the bus control floor. The proper indicating lamp is illuminated, Fig. 21(*b*) (Fig. 17 shows the third floor light illuminated). The G relays have open contacts in their circuit at this instant, Fig. 21(*f*), and are not ready to operate. The F relay, Fig. 23(*c*), is not operated until elevator 34 has arrived as manifested by closing of proper *x* limit switch and a *y* switch. This starts the main motor 59 in the proper direction to move the turn device 78 to latching position over the elevator carriage where the motor is de-energized by normally closed contacts of limit switch *xj*.

Now that *xj* has operated, its normally open contacts close the circuit to the proper G relay to energize the solenoid 138 to latch onto the elevator carriage and energize the clutch 60 to connect the main drive shaft 58 to the chain drives 52 and 54 and turn device 79 of that floor. In the remaining portion of the description of the control system, reference will be made only to the turn device 78 at the elevator end of the loop 25 being discussed, since the device 79 at the opposite end is never disconnected from the chain drives, and since it has no solenoid or cam such as 136 it will always latch to the carriage to move it around the turn.

The system operation to the point of latching the turn device 78 to the carriage on the elevator is common to all operations, whether the purpose is to store an automobile and bring back an empty carriage, store an automobile and bring back a stored one, or take an empty carriage up and bring back a stored automobile. At this point, the system must decide what is called for and operate accordingly. In the first place, before starting up the "latched" in and "clutched" in system, it must know in what direction to turn.

(1)(*a*) If no request has been received to unstore a parked automobile and an empty carriage is to be returned to the ground floor, the operation at this point concerns itself with circulating carriages in the loop in the direction to bring the closest empty carriage the shortest distance to the elevator. Where the carriage that was on the elevator is left is inconsequential.

(*b*) If no empty carriage is on this floor, the operation circulates carriages in a counter clockwise direction just sufficient to move the carriage off of the elevator and leave it in base position V of Figure 13(*a*). The elevator then moves to the nearest floor where an empty carriage can be found.

(2) If the upper floor elevator trip was to unstore an automobile, or if such request was received while en route to store one, the operation is exactly as (1)(*a*) above, except that the carriage containing the requested stored automobile, instead of the nearest empty, is moved onto the elevator. It might be well at this point to describe the system of determining the location and the selection of the loaded or empty carriage that is to be returned to the ground floor.

*Locating and selecting*

A switching network schematic wiring diagram is shown in Fig. 22, and an operational diagram is shown in Fig. 14, of the electrical equipment used to locate the empty carriages on any floor or a requested loaded carriage, wherever it might be.

Referring first to Fig. 14, the method of locating empty carriages will be described.

Carriages will be arranged at all times on each floor in consecutive *a, b, c,* etc., order. Their location relative to the fixed structure is variable, however, since the entire sequence arranged carriages are subject to loop circulation and may stop in any position. If the location of any one carriage relative to the fixed structure is ascertained, the location of the remainder is established because of the consecutive order of carriages in the loop.

In Fig. 14(*a*) eight carriages 32*a*, 32*b*, 32*c*, etc., are shown in a loop arrangement with carriage 32*c* at station 1B, 32*d* at station 2B, etc., in the upper half of the loop. In the lower half of the loop, carriage 32*b* is at station 1C, 32*a* at station 2C, etc. These 1B, 2B . . . 4B, 1C . . . 4C, stations are fixed stations relative to the structure, and the numeral indicates the positions distant from the elevator and the letter indicates upper or lower half of the loop.

Fig. 14(*a*) is shown and lettered as the 3rd floor, however, the arrangement of all except the ground floor are identical.

Each carriage of the eight shown has a distinguishing limit switch operator that will operate a matching limit switch only. The eight limit switches *xa*3, *xb*3 . . . *xh*3 are shown at station 1B, and as each of the carriages arrives at this station, it operates its respective limit switch. It will be noted that carriage 32*c* is in the limit switch station 1B, hence limit switch *xc*3 is shown closed. This information is switched into a network as shown in Fig. 14(*c*), and as will be described later.

At the same time, certain switch keys 200 are in their switches, indicating empty carriages, and other keys 200 have been removed, indicating loaded carriages. The key situation for the third floor is shown in Fig. 14(*b*). Keys are shown in place in switches *b*3*k*, *d*3*k* and *h*3*k* indicating these carriages are empty. This information is also switched into the network or correlation circuit.

*Moving empty carriage to ground floor*

Information is switched out of the network as manifested by energization of relays B1, B2 . . . B4 and C1 . . . C4, Fig. 14(*d*), and as will be described. These relays represent the station location of carriages both as to upper and lower loop section; B relays for the upper loop section, and C relays for lower loop section, and the numbers following the letter represent distance from the elevator. Relays energized denote empty carriages. Note that carriages 32*d*, 32*b*, and 32*h* are empty, as signalled from Fig. 14(*b*), and at their station positions signalled from Fig. 14(*a*). This information is pictured on the facsimile board 202, Fig. 17, by indicating lamps. Note the floor, 3rd, and the position of empty carriages in the loop.

Now referring to Fig. 22, it will be remembered that a specific floor control bus has been energized and a carriage is in the elevator latched to the turn device at a floor associated with the energized control bus. This control bus supplies energy to the station limit switches *xa*, *xb*, etc., Fig. 22(*a*), for the floor selected, and whichever 32*a*, 32*b*, 32*c* . . . 32*h* carriage happens to be at the limit switch station closes its limit switch energizing its respective A*a*, A*b* . . . A*h* relay. These relays, by closing multiple contacts in the network, Fig. 22(*c*), signals the position of the carriage sequence around the loop. At the same time, the key switches *a–k*, Fig. 22(*b*), signal the empty or load condition of each carriage to the network in Fig. 22(*c*). The network combines or correlates this information, energizing the B and C relays and the respective indicating lamps as previously described.

*Moving loaded carriage to ground floor*

Upon the insertion of keys 200, Fig. 22(*e*), in the switches, signals will be transferred to a tape 204, Fig. 22(*d*), in the order received. The tape 204 will transmit the signals directly to the *a–t* switches in the order received and in correct timing to the completion of each unparking operation. These *a–t* switches are normally closed switches and pass the information to the switching network to energize the proper B and C relays to indicate a loaded carriage in the same manner that the normally open *a–k* switches indicate empty carriages.

Figure 20:
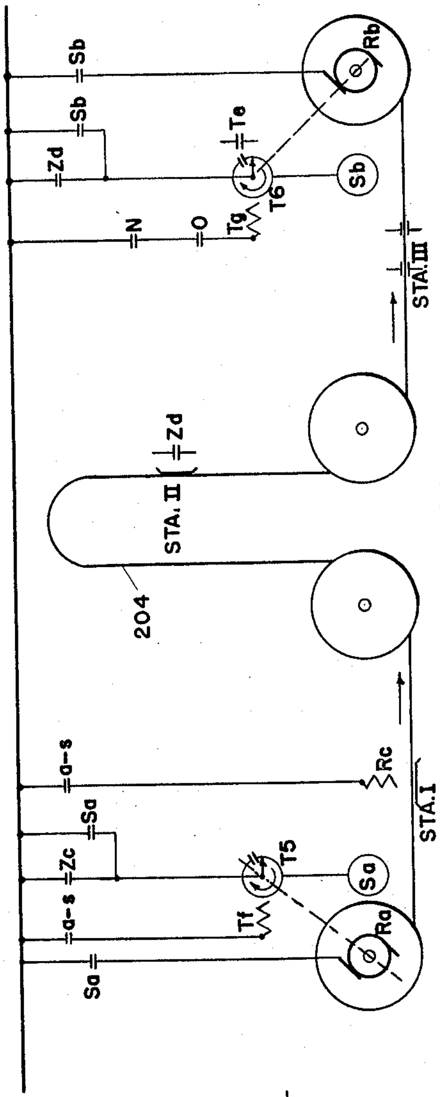
Figure 20 is a schematic side elevational view of the memory tape and a wiring diagram of the controls for the tape.
Figure 19:
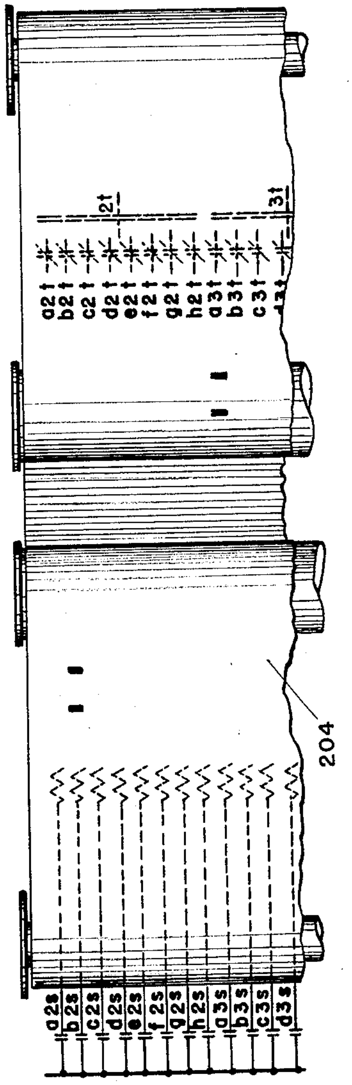
Figure 19 is a partial schematic plan view of a memory tape and a portion of the contacts used therewith in the preferred control system.

Figs. 19 and 20 show in detail the connections and operation of the signal tape 204 utilized in the unparking operation.

When the switch key 200 shown in Fig. 18 is inserted, it momentarily closes the *a–s* contact associated with a specific carriage which momentarily energizes a solenoid R*c*, Fig. 20, tape marking device. This solenoid operated device can code mark at STA. I the tape 204 for its particular circuit, or it can mark a certain position on the tape 204 corresponding with the take-off circuit position, as is shown in Fig. 19. The *a–s* contact also resets a timing device $T_t$, Fig. 20. Further key insertion momentarily closes contact Z*c*, which energizes relay S*a* through timing device T5 and seals itself in until the timing device contact opens. Relay contact S*a* closes the circuit to motor R*a* which is geared to the timer T5. The timer T5 allows the motor R*a* to move the left end of the tape 204 a distance equal to the tape length between STA. II and STA. III. Any number of key insertions can occur, resulting only in extending the tape loop between STA. I and STA. II. As long as the key 200 is in the inserted position, its *a–k* contacts are closed. These contacts are the ones previously mentioned for signalling empty carriage positions.

The signal take-off station is shown at STA. III of Fig. 20. Here the tape mark closes the *a–t* contact of Fig. 22(*b*), and also the floor control bus contacts 2*t*, 3*t* and 4*t* shown in Fig. 21. Motor R*b*, Fig. 20, moves the tape 204 from STA. II to STA. III and is initiated by a switch operated by tape contact at STA. II. This assures that when the last signal mark has been transmitted, the tape 204 will not advance. The timer T6, geared to motor R*b*, allows tape movement equal to tape distance between STA. II and STA. III. Even though contact Z*d* is closed, the motor R*b* cannot receive energy until the timer T6 is reset to close contact T*e*. It is this operation that holds the tape mark at STA. III until the unparking operation is complete as signified by closure of contacts N and O in the reset circuit, as will be described.

Completion of a parking operation can now be described, commencing with a loaded carriage 32 in the elevator 34 and latched to the respective turn device 78. Assume as a first condition that no signals have been received for a stored automobile, and that there is an empty available on the floor where the elevator has stopped.

Referring to Fig. 23(*a*), the K and J relays have the letter and number designations representing the station positions of empty and loaded carriages, exactly as did the B and C relays of Fig. 22(*c*). The K relays are initiated by empty carriages in one side of the loop, and the J relays by empty carriages in the other side. However, it will be noted that by placing combinations of B and C normally open and normally closed contacts in series with the K and J relays, Fig. 23(*a*), instead of all the relays designating empty carriages at certain stations, only the one representing the carriage nearest the elevator is energized, and when two emptys are equidistant, the J relay is always selected. Now since only one K or J relay is energized, its contacts, as shown in Fig. 23(*c*), will close. If it is a J relay, F motor contactor will close circulating the loop in one direction, whereas if it is a K relay, the carriages will circulate in the opposite direction by the energization of contactor E.

Before this carriage circulation starts, it must know when to stop. If a J1 or K1 relay is energized, the empty carriage must travel one position to the elevator 34; if a J2 or K2, two positions, etc. Therefore, if these relay contacts close the circuit to relay D, through timer devices T1, T2, etc., shown in Fig. 23(*d*) geared to the drive system, and the *xj* contact is closed relay D will be energized, sealing itself in until the timer breaks the circuit when the selected carriage arrives in the elevator. Note that contacts of the D relay are in the motor contactor E and F circuits to stop the drive at the proper time.

Now that the empty carriage is in the elevator 34, the respective turn device 78 is unlatched from the elevator carriage by the opening of the D contact in the G relay circuit, Fig. 21(*f*). This breaks the G contact seals; *xj* and normally closed *xi* are closed, but ineffective because of D contact. Normally closed N contact is open, since one of the timers T1, T2, etc., Fig. 23(*d*), has run its course and its auxiliary contact T*a*, T*b*, etc., has closed the circuit to the N relay.

The turn device 78 has now unlatched and is ready to move clear of the elevator 34. The E motor contactor, Fig. 23(*c*), is energized by the closing of the normally closed G contacts and the closing of the N contact, whereupon the unlatched turn device moves to position V Fig. 13, where it opens the normally closed limit switch *xi* and stops the turn device.

The operation of the *xi* limit switch closes a normally open *xi* contact in the elevator control circuit I-1, Fig. 21(*g*). Contact N is also closed. Closing this circuit starts the elevator 34 down and stops it at the ground floor. Upon arriving at the *x*1 limit switch, the N relay is de-energized. Not shown, but this *x*1 position resets all timer devices T1, T2, etc.

Referring back to the portion of the operation wherein a carriage was in the elevator at an upper floor, with the turn device 78 latched to the carriage, let it be assumed that there was no empty carriage on this floor. Assume further that the second floor control bus was energized. If there were no empty carriages on the 2nd floor, no K or J relays would be energized. This would cause W2 relay, Fig. 23(*b*), to close.

Since there are no empty carriages on the 2nd floor, the procedure at this point is to move the empty carriage off the elevator, move the elevator to the floor where there is an empty carriage, then move the empty carriage to the elevator and return to the ground floor.

Referring to Fig. 23(*c*), the motor contactor E will be energized by the W2 relay contacts and the normally closed N contacts. This moves the turn device with its carriage to position V, Fig. 13(*a*), where E contactor is de-energized by limit switch *xi*.

The closing of limit switch *xi* in conjunction with W2 contacts energizes the U2 relay, Fig. 21(*d*), which immediately seals itself in and its contacts transfer the supply from the second to the third floor control bus.

If there are no empty carriages on the third floor, relay W3, Fig. 23(*b*), closes, energizing relay U3, Fig. 21(*d*), which seals itself in and its contacts transfer the supply to the fourth floor control bus. If there are no empty carriages in the system, the U relays for all floors operate, and their contacts energize the V relay, Fig. 21(*e*), opening the U relay supply and sealing it open. The system will not operate now until a loaded carriage is emptied, to be later described.

Suppose though that when the U2 relay transferred the supply to the third floor control bus, and sealed itself in, relay W3 did not close, indicating an empty carriage on the third floor. Then U3 relay will not close.

Turn device 78 is in the clear position, with limit switch *xi* closed, and the elevator is at the second floor. Since the second floor control bus is now de-energized, the turn device 78 is unlatched at that floor.

The third floor control bus now energizes elevator control I-3, Fig. 21(*g*), which causes the elevator to move to the third floor, closing limit switch *x*3. Since there is no carriage in the elevator, the turn device 78 at the third floor can now latch in its present position to the carriage 32 in position V, Fig. 13(*a*). This is automatic upon the energization of the third floor control bus, Fig. 21(*f*). Since contact U2 is closed, G3 is energized through normally closed contacts *x*1 and N.

The latching or closing of the G relay (after the elevator has arrived and closed the *x*3 limit switch) completes the timed circuit to the D relay, Fig. 23(*d*), which is supplied through a U relay contact.

The D relay contact now starts the motor 59 in the proper direction by closing the circuit to the E or F contactor, Fig. 23(*c*), and the timer stops the motor when the carriage is on the elevator. Closing of an auxiliary timer contact T*a*, T*b*, etc., Fig. 23(*d*), operates N relay and initiates the ground floor elevator control, Fig. 21(*g*).

All conditions of returning an empty carriage to the ground floor have been described, and the conditions where a loaded carriage is to be selected and moved to the ground floor will now be described.

As previously noted, when the tape 204 moves into the unpark signal station (STA. II), Fig. 20, contact T*e* is closed, and the tape will remain in this position until reset by the closing of contacts N and O. Now referring to Fig. 21(*a*), note that T*e* is in the operating circuit to relay O, but the circuit is locked out by P contacts under certain conditions.

If the elevator 34 is on the ground floor, N relay will be open and its normally closed contacts will be closed to the P relay, Fig. 21(*a*), and since under this condition the motor contactors E and F will be de-energized, their normally closed contacts in the P relay circuit will be closed, and P relay will operate and seal in. This closes the supply of the O relay circuit down to the G latching relays, meaning that the floor control bus connection cannot be transferred until these contacts are closed. However, the T*e* contacts had immediately jumpered the L contact and initiated the cycle that takes the carriage on the elevator to its floor, and the turn device has turned and latched to the carriage on the elevator.

The O relay circuit cannot close until the turn device has moved to the elevator carriage, latched to it and moved back to its base position where the G relays are still energized and the *xi* limit switch is closed. If the tape signal is received any time before the E and F motor contactors have started the motor and the timers T1, T2, etc., relay P will seal in, and the O relay will transfer the supply to the floor control bus at the floor housing the wanted carriage when the turn device moves the carriage from the elevator to base position. If the tape signal is received after the drive system has started, the unparking operation is locked out until the elevator arrives at the ground floor.

When the O relay is energized, its contacts transfer the supply to the floor control bus housing the requested loaded carriage by opening the supply to the S and U relay contacts, Fig. 21(*d*), and closing through the 2*t*, 3*t* or 4*t* contacts, Fig. 21(*b*). The *t* contacts are made by the tape 204 at STA. III, Fig. 20. The floor control bus energized immediately initiates the elevator I controls, Fig. 21(*g*), to move the elevator to the proper floor and closing the associated *x* limit switch. If the loaded carriage is on the same floor, obviously the elevator will remain there. The O contacts also open the switch key *a–k* signal contacts, Fig. 22(*b*). The network, Fig. 22(*c*), then receives its signal from only the *t* contacts, Fig. 22(*b*), which comes from the tape 204, Fig. 22(*d*); one signal at a time. Since this contact is from a normally closed switch, it operates on the network exactly as did the *k* contacts, for signalling locations of empty carriages. Either a B or C relay, Fig. 22(*c*), will close to indicate the location of the requested loaded carriage. This will in turn select the half of the loop and timer T1, etc., by energizing the proper J or K relay, Figs. 23(c) and 23(d), as previously described.

Now since the carriage has been moved off the elevator to base position, there are no floor loops out of base position, all the y limit switches are in the non-operated position, and the normally closed y contacts, Fig. 21(f), are closed. This condition, along with the sealed in O relay contact, energizes the proper G relay, provided the elevator is at that floor as manifested by the closure of the proper x limit switch.

With the G contacts closed, the timer circuit to D relay, Fig. 23(d), is closed, in turn circulating the carriages in the loop in the proper direction by energizing the E or F relays, Fig. 23(c), and moving the requested loaded carriage onto the elevator. The operation continues exactly as though an empty were being taken to the ground floor.

If the tape 204 indicates more carriages are to be unstored, the operation repeats itself until all are taken care of.

From the foregoing it will be apparent that the present invention provides a novel storage system wherein the maximum number of articles may be stored, yet selectively removed when and as desired. The carriages in which the articles are stored are moveably supported on vertically spaced track loops in such a manner that the carriages may be raised and lowered by a conventional elevator construction, without reducing the number of carriages which may be stored on the loops. The orientation of the carriages remains the same throughout their movement through the system to provide a safe system and utilize the maximum available storage space. It will further be apparent that the present invention provides a novel method of mass storage, and a novel control system particularly adapted to the parking, storage and unparking of automobiles.

Changes may be made in the combination and arrangement of parts or elements, as well as steps and procedures, as heretofore set forth in the specification and shown in the drawings, it being understood that changes may be made in the precise embodiments shown and described without departing from the spirit and scope of the invention as defined in the following claims.

I claim:

1. In a mass storage system, track means extending horizontally and forming the major portion of an elongated loop having straight parallel sides and curved ends, the ends of said track means being positioned in spaced relation at one end portion of the loop, a plurality of carriage means movably supported on the track means, elevator means guided for vertical movement between the ends of the track means for individually moving said carriage means to and from the loop, additional track means on the elevator means shaped to mate with the ends of the first-mentioned track means and complete said loop in one position of the elevator means, means for moving the carriage means in end-to-end relation along the straight portions of the loop, and means for moving the carriage means around the curved portions of the loop and retaining each carriage means oriented in the same direction as when the respective carriage means is moved onto the respective curved portion of the loop, whereby said carriage means are oriented in the same direction during movement thereof around the entire loop.

2. A system as defined in claim 1 characterized further in that said track means comprises an inner track forming the major portion of an elongated loop, an outer track forming the major portion of an elongated loop supported concentrically around the inner track, the outer track loop being substantially longer than the inner track loop to position the curved ends of said inner and outer tracks spaced apart a distance greater than the adjacent straight portions of the tracks, a pair of roller assemblies swivelly secured in spaced relation to each carriage means to support the carriage means on said tracks, each of said roller assemblies having opposed rollers thereon positioned to simultaneously engage the inner and outer tracks along the adjacent straight portions of the loops, and the roller assemblies on each carriage means being spaced apart a distance substantially equal to the distance between the adjacent curved portions of the inner and outer tracks to alternately engage the inner and outer tracks at the opposite ends of the loops as the carriage means are moved around the track means while retaining their orientation.

3. A system as defined in claim 2 characterized further in that the rollers on the opposite sides of each roller assembly are of different sizes, the roller assemblies on each carriage means are extended in opposite directions, and each of said tracks has two sizes of rails thereon shaped to guide each roller assembly of each carriage means around the curved portion of the outer track at one end of the loops and around the curved portion of the inner track at the opposite ends of the loops.

4. A system as defined in claim 3 characterized further in that said roller assemblies are swivelly secured on the tops of the carriage means to suspend the carriage means from the inner and outer tracks.

5. A system as defined in claim 1 characterized further in that each carriage means has at least one vertical pin thereon, and said means for moving the carriage means in end-to-end relation along the straight portions of the loop comprises at least one endless chain having latches thereon spaced along the chain to engage said pins as the carriage means are moved onto the straight portions of the loop and release said pins as the carriage means are moved onto the curved portions of the loop, and drive means for the chain.

6. A system as defined in claim 1 characterized further in that each of said means for moving the carriage means around the curved portions of the loop and retaining each carriage means oriented in the same direction as when the respective carriage means is moved onto the respective curved portion of the loop comprises an arm pivotally secured in alignment with the center line of the loop for pivotal movement in a horizontal plane, an elongated latch pivotally carried by the arm in a position to engage spaced points of each carriage means as the respective carriage means is moved onto the curved portion of the loop, means for turning said arm about its axis to move the carriage means around the respective curved portion of the loop, and means for retaining said latch extended in the same direction during turning of said arm to retain the orientation of the carriage means.

7. A system as defined in claim 2 characterized further in that said roller assemblies extend upwardly from the respective carriage means to suspend the carriage means from said inner and outer tracks, each of said carriage means having a pair of spaced latch receptacles in the top portion thereof, and the means for moving the carriage means around the curved portions of said tracks at each end of the loops comprises a tubular member secured on a vertical axis intersecting the center line of the loops and positioned between the curved portions of the inner and outer tracks, a first shaft journaled in the tubular member, an arm carried by said shaft to extend horizontally over a carriage means depending from the curved portions of the tracks, a second shaft journaled in said arm on a vertical axis in a position to extend above a carriage means depending from the curved tracks, an elongated latch slidably carried on said second shaft for engaging the latch receptacles in the carriage means, a guide on said second shaft for turning the elongated latch with said second shaft, a lever pivotally secured to said arm and said latch for moving the latch into and out of engagement with said receptacles, means for pivoting said lever, means for turning said first shaft and turning said arm in a horizontal plane, and a gear train extending from said tubular member to said second shaft for turning said second shaft in said arm and retaining said latch extended in the same direction during turning of said arm.

8. A system as defined in claim 1 characterized further in that each carriage means has at least one latch engaging pin thereon and two spaced latch receiving receptacles therein, the means for driving the carriage means along the straight portions of the loop comprises three endless chains extending horizontally in overlapping relation, latches on said chains spaced to engage said pins and propel the carriage means along the loop, means for driving the chains at different speeds to propel the carriage means at higher speeds near the curved end portions of the loop, and each of said means for moving the carriage means around the curved portions of the loop comprises an arm supported for pivotal movement around a vertical axis intersecting the center line of the loop, and a latch pivotally carried by said arm in a position to engage said latch receiving receptacles of a carriage means supported on the respective curved portion of the loop, means for turning said arm and moving the carriage means through the respective curved portion of the loop at a speed substantially equal to the speed of the carriage means at the ends of the straight portions of the loop, and means for retaining said last-mentioned latch extended in the same direction during turning of said arm to retain the orientation of the carriage means.

9. In a mass storage system, a plurality of vertically spaced track means, each of said track means being extended horizontally and forming the major portion of an elongated loop having straight parallel sides and curved ends, the opposite ends of each of said track means being positioned in spaced relation at one end portion of the respective loop to provide a gap in the respective loop, said vertically spaced track means being positioned to vertically align the gaps in the loops, a plurality of carriage means movably supported on each of said loops, elevator means guided for vertical movement through said gaps to move carriage means to and from each loop, additional track means on the elevator means shaped to mate with the ends of each of the track means and selectively complete the vertically spaced loops, drive means at each loop to propel the carriage means along the straight portions of the respective loop in end-to-end relation, and means for moving the carriage means around the curved portions of each loop and retaining each carriage means oriented in the same direction during movement around the respective curved portion of the respective loop, whereby the carriage means on each loop are oriented in the same direction during movement thereof around the complete loop.

10. A system as defined in claim 9 characterized further in that each of said means for moving the carriage means around the curved portions of the loops comprises an arm supported for pivotal movement about a vertical axis intersecting the center line of the respective loop, a latch pivotally secured on said arm in a position to engage a carriage means supported on the respective curved portion of the respective loop, means for turning said arm and moving the carriage means around the respective curved portion of the respective loop, said latch being elongated to engage two spaced points of a carriage means, and means for turning said latch during turning of said arm to retain a carriage means engaged by said latch oriented in the same direction during movement around the respective curved portion of the respective loop.

11. A mass storage system, comprising an inner horizontally extending track forming the major portion of an elongated loop having straight parellel sides and curved ends, the ends of said inner track being spaced apart at one end of the loop, an outer track extending around the inner track forming the major portion of an outer loop concentrically around the inner loop, the ends of the outer track being aligned with the ends of the inner track, said outer loop being substantially longer than the inner loop, a carriage elevator, means for moving the elevator vertically between the ends of the inner and outer tracks, tracks carried by the elevator and shaped to mate with the ends of the inner and outer tracks to complete said loops in one position of the elevator, a plurality of carriages, a pair of roller assemblies swivelly secured to each carriage in spaced relation to support the carriage on said tracks, each of said roller assemblies having rollers extended from opposite sides thereof for engaging both of said tracks along the straight portions of the loops, means for driving the carriages along the straight portions of the loops in end-to-end relation, means for moving the carriages around the curved portions of the loops and retaining the carriages oriented in the same direction during movement around the curved portions of the loops as during movement along the straight portions of the loops, said rollers and tracks being shaped for engagement by each roller assembly of a carriage with the curved portion of the outer track at one end of the loops and the curved portion of the inner track at the other end of the loops.

12. A system as defined in claim 11 characterized further in that a plurality of sets of said inner and outer tracks are supported in vertically spaced relation and arranged with the ends of the respective vertically spaced inner and outer tracks vertically aligned to define a vertical elevator shaft extending between the ends of all of the tracks, said carriage elevator being movable through each set of tracks to selectively complete the inner and outer loops at the various levels, said means for moving the carriages along the straight portions of the various loops comprises endless chains at each level, and latches on each chain spaced to engage a carriage supported on the adjacent tracks, and said means for moving the carriages around the curved portions of the loops comprises an arm pivotally supported at each end of each set of tracks for horizontal turning movement, a latch pivotally carried by each arm in a position to engage a carriage supported on the respective curved portions of the respective tracks, means for turning said arm and propelling the carriages around said curved track portions, means for turning each latch with respect to its supporting arm and retaining the carriages oriented in the same direction during their movement around the respective curved track portions, and means for latching and unlatching the last-mentioned latches to and from the carriages.

13. A mass storage system, comprising guides forming a vertical elevator shaft, a plurality of horizontally extending track loops intersecting said shaft in vertically spaced relation, each of said track loops being elongated with straight sides and curved ends and being interrupted in an end portion thereof by said shaft, a plurality of carriages movably supported on each track loop, an elevator in said shaft having tracks thereon to mate with and complete any one of said track loops when positioned at the respective track loop for supporting a carriage moved from the respective track loop into said shaft, separate drives for each loop to move carriages along the straight portions of the loops, a turn device at each end of each loop for moving carriages around the curved ends of each loop when the elevator is in position to complete the respective loop, a latch on each turn device for selective engagement with a carriage on the respective end portion of the respective loop, a loaded carriage selection circuit for signalling requests for loaded carriages from the loops, a carriage location circuit for each loop for producing a signal indicating the relative positions of the carriages on each loop, a switching network receiving signals from said selection and location circuits, an elevator control circuit operated by the switching network for automatically moving the elevator to and from the loop containing a requested carriage, and control circuits operated by the switching network energizing the drive and turn devices for the respective loop to move the selected carriage into said shaft when the elevator is in carriage receiving position at the respective loop.

14. A system as defined in claim 13 characterized further to include an empty carriage information circuit for notifying the switching network of the empty carriages in the system, and means for preventing reception of empty carriage signals by the switching network when the network is responding to requests for loaded carriages.

15. A system as defined in claim 13 characterized further in that each carriage location circuit includes a number of limit switches at each loop equal to the number of carriages stored on the respective loop, each of said carriages having a limit switch operator thereon positioned to operate a corresponding limit switch at the respective loop, the limit switches at each loop being located at a single storage position for selective actuation by one of the carriages in the loop when all of the carriages for the respective loop are in normal storage positions, the limit switches at each loop being positioned identically, and an identical set of limit switches positioned at the lower end of the elevator shaft.

16. A system as defined in claim 13 characterized further in that the loaded carriage selection circuit includes a memory system for storing requests and feeding the requests to the switching network at the completion of each unloading operation.

17. A system as defined in claim 16 characterized further in that said memory system includes a tape driven at one point in response to requests, and at a spaced point in response to completion of unloading operations.

18. A system as defined in claim 13 characterized further in that the control circuits for energizing the drive and turn devices include timers for de-energizing the drive and turn devices when the requested carriage has been moved into the elevator shaft.

19. A system as defined in claim 13 characterized further to include a main motor connected directly to all of said turn devices in the elevator ends of the loops, an electrically operated clutch at each loop for selectively connecting the main motor to the respective drive for the loop and the turn device at the opposite end of the loop, a solenoid at each loop for actuating the respective elevator end turn device latches of the loop, said control circuits being connected to the switching network for energizing the main motor separately from the clutches and solenoids and for energizing the solenoid of each loop simultaneously with energizing of the respective drive for the loop, timers in the control circuits for unlatching the elevator end turn devices and stopping the drive of the loop containing the requested carriage when the requested carriage enters the elevator shaft, and a limit switch at the respective loop for stopping the main motor when the turn device which moved the requested carriage has moved to the side of the elevator shaft following unlatching of the respective turn device from the requested carriage.

20. A system as defined in claim 14 characterized further in that the loaded carriage selection circuit includes a switch for each carriage of the system, said empty carriage information circuit includes a switch for each carriage of the system, each pair of said switches associated with each carriage being positioned in a common switch key receptacle, and a key for each switch key receptacle designed to actuate said switches upon insertion and withdrawal of the respective key to initiate operation of the system.

21. In a system for storing a plurality of carriages at an elevated level, comprising means for movably supporting the carriages in a horizontally extending elongated loop pattern having parallel sides and curved end portions, elevator means intersecting one end portion of the loop pattern for removing and replacing carriages from said pattern, drive means for simultaneously moving the carriages around said pattern until a selected carriage is positioned in said elevator means, said drive means including means for moving said carriages through said one end portion of the loop pattern at an increased speed to increase the spacing between each carriage moving through said elevator means and adjacent carriages, and means for retaining said carriages oriented in the same direction during movement around said loop pattern.

References Cited in the file of this patent

UNITED STATES PATENTS

| | | |
|---|---|---|
| 1,133,734 | MacFadden | Mar. 30, 1915 |
| 1,775,799 | Young | Sept. 16, 1930 |
| 1,837,605 | Baker | Dec. 22, 1931 |
| 1,869,794 | Bell | Aug. 2, 1932 |
| 1,877,293 | Geiger | Sept. 13, 1932 |
| 2,849,127 | Densmore | Aug. 26, 1958 |